US010127433B2

United States Patent
Ascierto et al.

(10) Patent No.: US 10,127,433 B2
(45) Date of Patent: Nov. 13, 2018

(54) SYSTEMS AND METHODS FOR GENERATING FIELDS OF VIEW

(71) Applicant: Ventana Medical Systems, Inc., Tucson, AZ (US)

(72) Inventors: Paolo Ascierto, Marano di Napoli (IT); Michael Barnes, Oro Valley, AZ (US); Christophe Chefd'hotel, Sunnyvale, CA (US); Ting Chen, Sunnyvale, CA (US); Alisa Tubbs, Phoenix, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 15/448,511

(22) Filed: Mar. 2, 2017

(65) Prior Publication Data
US 2017/0270346 A1    Sep. 21, 2017

Related U.S. Application Data

(63) Continuation of application No. PCT/EP2015/070100, filed on Sep. 3, 2015.
(Continued)

(51) Int. Cl.
*G06K 9/00* (2006.01)
*G06K 9/52* (2006.01)
(Continued)

(52) U.S. Cl.
CPC .......... *G06K 9/00147* (2013.01); *G06K 9/52* (2013.01); *G06K 2009/4666* (2013.01); *G06K 2209/05* (2013.01)

(58) Field of Classification Search
CPC ................. G06K 9/00; A61K 39/00
(Continued)

(56) References Cited

U.S. PATENT DOCUMENTS

| 8,815,524 B2 * | 8/2014 | Hirokawa | .......... G01N 33/5091 435/7.21 |
| 2014/0185891 A1 * | 7/2014 | Schoenmeyer | ....... G06T 7/0012 382/128 |

FOREIGN PATENT DOCUMENTS

WO    2013148458 A1    10/2013

OTHER PUBLICATIONS

De Boer et al., Micrometastases or Isolated Tumor Cells and the Outcome of Breast Cancer, The New England Journal of Medicine, Aug. 13, 2009, pp. 653-663, vol. 361, No. 7.
(Continued)

*Primary Examiner* — Abolfazl Tabatabai
(74) *Attorney, Agent, or Firm* — Ventana Medical Systems, Inc.

(57) ABSTRACT

Embodiments disclosed herein are directed, among other things, to imaging systems, methods, and apparatuses for automatically identifying fields of view (FOVs) for regions in an image encompassing tumor are disclosed. In embodiments and in further aspects of the present invention, a computer-implemented method is disclosed for a tumor region based immune score computation. The method, in accordance with the present invention, involves identifying regions, for example, tumor areas or regions around a tumor area, partitioning a whole slide image or portion of a whole slide image into multiple regions related to the tumor, selecting FOVs within each identified region, and computing a number of cells present in each FOV. An immune score and/or immune-related score may be generated based on the cells counted in each FOV.

20 Claims, 16 Drawing Sheets

Related U.S. Application Data

(60) Provisional application No. 62/045,484, filed on Sep. 3, 2014.

(51) Int. Cl.
*A61K 35/26* (2015.01)
*G06K 9/46* (2006.01)

(58) Field of Classification Search
USPC ....... 382/128, 129, 130, 131, 132, 133, 134; 424/577; 436/506
See application file for complete search history.

(56) References Cited

OTHER PUBLICATIONS

Galon et al., Type, Density, and Location of Immune Cells Within Human Colorectal Tumors Predict Clinical Outcome, Science, 2006, pp. 1960-1965, vol. 313.

Gerdes, M.J. et al., Highly multiplexed single-cell analysis of formalin-fixed, paraffin-embedded cancer tissue, PNAS, (2013), pp. 11982-11987, vol. 110 No. 29.

Greene, F.L. et al., AJCC Cancer Staging Manual, -, May 10, 2002, pp. 225-230, sixth ed., Part 2, Springer.

International Search Report and Written Opinion dated Apr. 15, 2016 in corresponding PCT/EP2015/070100 filed Sep. 3, 2015, pp. 1-26.

Invitation to Pay Additional Fees / Partial Search Report dated Jan. 4, 2016 in corresponding PCT/EP2015/070100 filed Sep. 3, 2015, pp. 1-11.

Sloothaak et al., The prognostic value of micrometastases and isolated tumour cells in histologically negative lymph nodes of patients with colorectal cancer: A systemic review and meta-analysis, The Journal of Cancer Surgery (EJSO), Dec. 2013, pp. 263-269, 40 (2014).

Van Akkooi et al., Isolated Tumor Cells and Long-Term Prognosis of Patients with Melanoma, Annals of Surgical Oncology, Jan. 15, 2008, pp. 1547-1548, 15 (5).

\* cited by examiner

SYSTEMS AND METHODS FOR GENERATING FIELDS OF VIEW

CROSS-REFERENCE TO RELATED APPLICATIONS

This patent application is a continuation of International Patent Application No. PCT/EP2015/070100 filed Sep. 3, 2015, which claims priority to and the benefit of U.S. Provisional Patent Application No. 62/045,484, filed Sep. 3, 2014. Each of the above patent applications is incorporated herein by reference as if set forth in its entirety.

FIELD

The present disclosure relates to automatically identifying fields of view in a biological specimen. More particularly, the present invention is directed to an imaging system for automatic identifying of fields of view (FOVs) for regions in an image encompassing tumor cells.

BACKGROUND

Several immune cells, e.g. B cells or T cells, infiltrate various types of tumors and are known to have an effect on the further tumor development. The capability to escape destruction by an immune cell is meanwhile considered as an important hallmark of many cancer types. The effect of the immune cells may depend on the cancer type. The type of the infiltrating immune cells, for example, T-cells, B-cells or macrophages and the degree of infiltration may have an impact on tumor progression. Thus context-specific information relating to the infiltration of tumor tissue with immune cells may be used for making a prognosis of the tumor development for a particular patient.

Typically, in immune score computations, the scientist uses a multiplex assay that involves staining one piece of tissue or a simplex assay that involves staining adjacent serial tissue sections to detect or quantify, for example, multiple proteins or nucleic acids etc. in the same tissue block. With the stained slides available, the immunological data, can be estimated from the tumor tissue samples. It has been reported that this data can be used to predict the patient survival of colorectal cancer and demonstrates important prognostic role. In both the microscopy slide interpretation process and the digital pathology workflow, the expert reader reviews the slide under a microscope. The expert reader may read the image of a slide, which has been scanned or digitized, from a monitor in order to make a prediction of further tumor development. However, such a manual, subjective assessment of the prognosis given a particular infiltration pattern of the tumors of a slide is not reproducible. Rather, it is highly subjective and biased to the readers. As a consequence, tumor progress predictions based on a manual inspection of tumor cell slides tend to vary from pathologist to pathologist, and are not reproducible.

Also, many methods of computing an immune score do not consider activity of lymphocytes outside of the tumor. United States patent application 20140185891A1, entitled Generating Image-Based Diagnostic Tests By Optimizing Image Analysis and Data Mining Of Co-Registered Images, discloses an image-based test diagnostic tests that predicts a probability of recurrence of cancer utilizing heat maps generated from overlapping features in a combined image of adjacent tissue sections. However, the method appears applicable to cell counts in the tumor. Thus, the computations are limited to cellular activity or counts within an identified tumor region, and do not factor in the activity of cellular activity outside of the tumor region. United States patent application 20130203614A1, entitled Methods for Predicting the Survival time of a Patient Suffering from a Solid Cancer, discloses methods for the prognosis of survival time of a patient having colon cancer that appears to consider the invasive margin of the colon cancer tumor. However, the method disclosed in U.S. patent application 20130203614A1 is directed to cells that are known to be associated with colorectal cancer and does not appear to present a digital imaging methodology that promotes a methodology that generates a consistent prognosis.

All references, including any patents or patent applications cited in this specification are hereby incorporated by reference. No admission is made that any reference constitutes prior art or form part of the common general knowledge in the art.

SUMMARY

The present invention is directed to imaging systems, methods, and apparatuses for automatically identifying fields of view (FOVs) for regions in melanoma digital image encompassing tumor cells. In a further aspect, the invention relates to a computer-implemented method and system for immune score computation using said fields of view.

It is an objective of the present invention to provide for an improved method and system for FOV identification and/or immune score computation as specified in the independent claims. Embodiments of the invention are given in the dependent claims. Embodiments of the present invention can be freely combined with each other if they are not mutually exclusive.

In one aspect, the invention relates to a method for automatic immune score computation. The method is performed by a processor of an image analysis system and comprises:

reading multiple marker images from memory, the pixel intensities of each marker image corresponding to the amount of a respective immune cell marker on a slide used for generating said marker image, each of the multiple marker images corresponding to a different immune cell marker;

computing a tumor image by processing an input image, the input image depicting the same tissue section as the tissue section depicted by the multiple marker images or depicting a tissue section adjacent to one of the tissue sections depicted by the multiple marker images, the tumor image selectively indicating tumor cells contained in one or more tumors;

identifying one or more regions in the tumor image, each identified region belonging to one of a plurality of predefined, cancer-type specific regions within or at the periphery of the one of the one or more tumors; and registering two or more of the marker images and the tumor image to a common coordinate system if the two or more of the marker images and the tumor image originate in different coordinate systems. For example, the marker images may originate in different coordinate systems in case the marker images are derived from different tissue slides via a simplex staining approach.

The processor identifies, for each of the two or more marker images, one or more fields of view in said marker image by:

a) using each of the mapped regions within the marker image as a field of view of the marker image; or b) processing the marker image for identifying pixel areas whose pixel intensity values are local intensity maxima within the marker image and which lie within one of the identified regions of the tumor image in the common coordinate system; and using the identified pixel areas as the fields of view of said marker image.

The method further comprises calculating an immune score, thereby selectively using image information derived from all fields of views of the two or more registered marker images as input.

This may have the advantage that a reproducible method is provided for processing one or more digital images in a way that an immune score can be calculated that allows an accurate prognosis, e.g. in respect to the effect on response to cancer therapies, disease-free survival and overall-survival.

Thus, contrary to manually inspecting and evaluating a tissue slide stained with one or more immune cell markers, embodiments of the invention allow to reproducibly calculate the same (or a similar) immune score for the same (or similar) digital image and corresponding tumor tissue slide. Thus, the reproducibility and also the quality of the prognosis are increased. While state of the art approaches of predicting tumor development based on inconsistent tissue region selection criteria, different qualitative and quantitative criteria to measure immune infiltration, embodiments of the present invention allow providing a clearly defined, reproducible manner of computing an immune score.

In a particularly beneficial aspect, the fields of view (FOVs) which are the basis for immune score calculation are selected based on objective criteria (local intensity maxima). Thus, the immune score calculation based on said FOVs and all intermediate steps such as, for example, counting the immune cells, are performed in a reproducible manner.

According to embodiments, the processor of the image analysis system counts immune cells via an automatic cell detection algorithm in each automatically identified FOV in each of the two or more selected marker images. The final counts of different types of immune cells are used for calculating the immune score of the tissue section(s) from which the marker images was (were) derived. This immune score may assist a physician in making a prognosis for a patient.

According to embodiments, the calculation of the immune score comprises:

for each of the fields of view in each of the two or more registered marker images:
  applying a cell detection algorithm on pixel intensity information of the marker image and automatically counting all detected cells within said field of view;
  determining the immune cell type of the detected cells;
  determining the immune cell density within said field of view; and/or
  determining the region type of the region of the tumor image to which said field of view belongs to in the common coordinate system and assigning the cell count, cell type and/or cell density information with the determined region type;
processing the cell count, cell type, density and/or the assigned region type information of all fields of views of the two or more marker images, wherein the height of the immune score correlates with the density of immune cells in the identified regions.

When the immune response is high, the cells are clustered together and the regions show a high immune cell density, while when the immune response is low, the cells are more scattered and the regions have a low immune cell density.

Generally, a high immune score and a strong immune response is a positive predictor, i.e., such a finding may increase the likelihood that the cancer can be treated.

The automated identification of immune cell types, their respective count and their cell densities in predefined tumor regions within the tumor or at the periphery of the tumor may be beneficial as the reproducibility of immune score computation is further increased. Each of said features is automatically identified based on reproducible, objective criteria.

According to embodiments, the immune cell type is derived from the type of biomarker to which the marker image corresponds. For example, if immune cells of a particular immune cell type typically express high amounts of a particular protein (biomarker) while other immune cell types do not, said biomarker may be selectively stained and the color signal emitted by said stain may be captured in a respective color channel of a multiplex image or in a respective simplex image. The intensity of the emitted color signal of said stain will correlate with the amount of the biomarker expressed by said immune cells and thus will correlate with the number and density of immune cells of said particular immune cell type in any region of the slide the marker image was derived from.

For example, an immune cell marker may be specific for a particular immune cell type such as B cells or T cells. According to embodiments, at least some of the markers for which marker images are derived are CD-antigens (CD: "cluster of differentiation"). In particular, the markers may comprise or consist of CD antigens allowing the identification of the immune cell type (see table below):

| Type of cell | CD markers |
| --- | --- |
| stem cells | CD34+, CD31−, CD117 |
| all leukocyte groups | CD45+ |
| Granulocyte | CD45+, CD11b, CD15+, CD24+, CD114+, CD182 |
| Monocyte | CD45+, CD14+, CD114+, CD11a, CD11b, CD91, CD16 |
| T lymphocyte | CD45+, CD3+ |
| T helper cell | CD45+, CD3+, CD4+ |
| T regulatory cell | CD4, CD25, and Foxp3 |
| Cytotoxic T cell | CD45+, CD3+, CD8+ |
| B lymphocyte | CD45+, CD19+, CD20+, CD24+, CD38, CD22 |
| Thrombocyte | CD45+, CD61+ |
| Natural killer cell | CD16+, CD56+, CD3−, CD31, CD30, CD38 |

Said features may be advantageous as an automated and reproducible approach to study the correlation of the immune cell distributions and the patient outcomes is provided. It has been studied in literature (Galon, J., et al.: Type, Density, and Location of Immune Cells Within Human Colorectal Tumors Predict Clinical Outcome. Science 313 (5795), 1960-1964 (2006)) that the population distribution of each type of immune cells may be correlated with the clinical outcomes of the patients. However, due to the subjectivity of the manual evaluation of the distribution of individual immune cell types, the validity and reproducibility of such approaches is limited. Thus, embodiments of the invention may allow to repeat a particular type of correlation study in a more reproducible manner, thus increasing the accuracy of the results of such studies.

For example, chronic inflammation and the presence of M2 macrophages favor tumor growth and spreading. Lymphocytes are not randomly distributed but are located in a specific regions. Natural killer cells are found in the stroma and are not in contact with tumor cells. These cells, to the contrary, are mostly found in the invasive margin of growing tumors and in tertiary lymphoid structures that are adjacent to tumor beds. T cells may be located in the invasive margin but can also be found in the tumor core. The distribution of immune cells varies between different cancer types. All subsets of T cells are present at the core and at the invasive margin of a tumor in melanoma, colorectal cancer, head and neck cancers, and non-small-cell lung cancer. In colorectal cancer, the proportion of two Morse with high densities of CD4+ memory T cells and CD8+ memory T cells decreases with local tumor invasion, that is, the density is lower in T4-stage tumors than in T1-stage tumors. The density of CD8+ T cells seems to correlate with poor prognosis in renal cell cancer. (Fridman W. H et al., "the immune context in human tumors: impact on clinical outcome", Nature Reviews|Cancer, April 2012).

According to embodiments, the immune cell marker is selectively indicative of an immune cell type. The immune cell type is, for example, one of a T cell, a B cell or a macrophage. The calculation of the immune score comprises determining, by the image analysis system, the cell count, and/or determining the cell density in the fields of views for each of the identified cell types separately. For example, the counting the cells can be performed in the fields of views identified in the individual marker images. Alternatively, the counting of the cells can be performed by overlaying and merging the fields of vies of multiple marker images for generating merged fields of views (also referred to as "final FOVs"); mapping the merged fields of view back to the respective marker images; and counting the cells in the merged fields of views mapped to the individual marker images. The merging may be, for example a UNION or INTERSECT operation of overlaid FOVs of different marker images.

In addition, the calculation of the immune score comprises applying, by the image analysis system, cell-type and cancer-type specific rules on the cell count and/or the cell density and on the type of region within which the field of view is located for calculating the immune score.

The rules may be implemented, for example, as program logic of a software module or program, e.g. a Java or C# program, or as a set of stored procedures in a database management system.

This may be advantageous as the size and distribution of tumor cell clusters may vary in different types of cancer. Thus, the size and shape of inner-tumor regions, peri-tumor regions and/or of different types of metastasis and other forms of tumor cell clusters may depend on the cancer type. By providing cancer-type specific rules for identifying the regions in the tumor image, a more accurate immune score may be computed.

Preferentially, the rules or at least the thresholds evaluated by the rules can be edited by a human user via a user interface without having to recompile or redeploy the program logic.

This may be advantageous as a human operator of the system may easily add additional rules or modify the criteria and/or thresholds evaluated by existing rules as to support the automated identification of further immune cell types and/or to adapt the rules to more accurately identify immune cell types and/or tumor-related regions relevant for the prognosis of tumors of a particular cancer type.

According to embodiments, the identification of the fields of view according to b) comprises:
applying a low pass filter on the marker image to obtain a low pass filtered image;
applying a local maximum filter to the low pass filtered image to obtain a heat map of the marker image, the local maxima of the heat map indicating local pixel intensity maxima, the intensity values of the pixels of the heat map indicating the density of the marker at the slide area represented by said pixels; and
identifying a number (K) of pixel areas in the heat map having the highest pixel intensity values within said heat map or whose pixel intensity values are above a threshold; and
using the identified pixel areas as fields of view of said marker image.

For example, the top K pixel areas with the highest intensity values are selected from each identified region within a marker image. K may be any integer larger than 0. Typical examples for K are 3, 5, 10, 15 or 20. If K=3 and if the marker image comprises 4 identified regions, then the marker image may comprise 12 FOVs (or less in case the K pixel areas with the highest intensity values are required to have an intensity value that is greater than a predefined threshold). The intensity values of each pixel area may be determined by calculating an average intensity value of all pixels in said pixel area, e.g. the arithmetic mean or the median. The size of each FOV may depend on the intensity values in the pixel areas constituting the local intensity maxima. For example, the size of the FOVs may be determined in a threshold based manner and have an irregular size. Alternatively, each FOV may have a predefined shape, e.g. a circle or a square that completely covers the pixels belonging to the local intensity maximum.

Using only the K pixel areas with the highest intensity value may be advantageous as the impact of noise and staining artifacts is reduced. The local maxima will very likely be caused by the stain used for specifically staining the marker of the respective marker image. Thus, the immune score calculation is not compromised by counting cells in the marker image that in fact are staining artifacts, not cells.

According to embodiments, the identification of the regions in the tumor image comprises:
identifying pixel blobs in the tumor image whose intensity values are above a threshold;
identifying one or more features of each of the pixel blobs, the features comprising at least one of the diameter of the pixel blob, the shape of the pixel blob and/or distance of the pixel blob to the closest neighboring pixel blob in the tumor image;
applying cancer-type specific rules on the determined one or more features of the pixel blobs for:
determining to which one of a plurality of predefined, cancer-type specific intra-tumor region types the pixel blob belongs and using the identified pixel blobs the identified regions within one of the one or more tumors;
identifying further pixel regions in the neighborhood of the pixel blobs in the tumor image by respectively expanding the identified intra-tumor regions by a predefined distance, the predefined distance depending on the type of the identified intra-tumor region;
using the identified further pixel regions as the identified regions in the tumor image lying in the periphery of the one or more tumors.

In addition, the image analysis system may assign each of the identified regions a label indicating one of the predefined, cancer-specific region types the identified region belongs to.

This may be advantageous as the various regions of a tumor, e.g. inner-tumor regions, regions at the periphery of a tumor, tumor regions belonging to the inner or periphery of micro- or macro-metastasis or the like are identified dynamically in a cancer-type specific manner. The rules may be adapted to the typical size and shape of tumor cell clusters of a particular cancer, thereby allowing to more accurately determine the invasion of the tumor and its periphery by immune cells of various types.

According to embodiments, the plurality of predefined, cancer-type specific regions comprises one or more of:
- micro-metastasis: a region in the tumor image with a diameter greater than a first threshold and less than a second threshold;
- periphery of Micro-metastasis: a region in the tumor image in the neighborhood of a Micro-metastasis, the neighborhood being defined by a third threshold acting as distance threshold;
- macro-metastasis: a region in the tumor image with a diameter greater than the second threshold;
- Periphery of Macro-metastasis: a region in the tumor image in the neighborhood of a Macro-metastasis, the neighborhood being defined by a fourth threshold acting as distance threshold;
- isolated tumor cell cluster: a region in the tumor image with diameter less than the first threshold;
- group of isolated tumor cell clusters: a region in the tumor image comprising a group of isolated tumor cell clusters that are within a fifth threshold to each other;
- periphery of group of isolated tumor cell clusters: a region in the tumor image in the neighborhood of a group of isolated tumor cell clusters, the neighborhood being defined by a sixth threshold acting as distance threshold.

According to embodiments, the cancer type is melanoma. The following thresholds are preferentially used for identifying immune cells associated with or infiltrating melanoma:
- first threshold: 0.2 mm;
- second threshold: 0.7 mm;
- third threshold: 0.2 mm;
- fourth threshold: 0.2 mm;
- fifth threshold: 0.5 mm; and/or
- sixth threshold: 0.2 mm.

According to embodiments, the cancer type is melanoma and the two or more markers are two or more of: CD3, CD8, FoxP3 and CD20.

For example, the tumor image can be a whole slide image. Each marker image can also be a whole slide image or a part thereof.

According to embodiments, the method further comprises assigning labels to each of the regions in the tumor image; each label is indicative of the type of said region; and transferring the labels of the regions from the common coordinate system back to the coordinate system of each of the marker images. For example, the labels may be one or more of: "micro-metastasis", "macro-metastasis", "periphery of micro-metastasis", or "periphery of macro-metastasis" or the like.

According to embodiments, the calculation of the tumor image from the input image comprising:
- computing a tissue mask from an image from which at least one of the marker images and/or the tumor image is derived; for example, the tissue mask may be a mask derived from an image of a H&E stained tissue section in which all pixels whose intensity value is below a threshold and/or whose context indicates that the pixel represents a region outside the tissue is masked; the tissue may comprise tumor cells as well as healthy cells;
- apply the tissue mask on said marker image or a derivative thereof for generating a noise-reduced marker image; thus, the tissue mask may filter out pixels outside the tissue to increase processing speed and to filter out noise and staining artifacts.

According to embodiments, the method comprises computing, by the image analysis system, a tumor mask from the noise-reduced tissue image and applying the tumor mask on said noise-reduced tissue image for generating the tumor image selectively indicating tumor cells. For example, the tumor mask may be a mask derived from the H&E image or from a digital image of the same or an adjacent tissue section stained with a tumor-cell specific stain in which all pixels whose intensity value is below a threshold and/or whose context indicates that the pixel represents a region or cell not being a tumor cell is masked; thus, according to embodiments, the tumor image may solely comprise intensity information derived from tumor cells and lack any intensity information of immune cells.

Said features may be advantageous because the accuracy of immune score computation may be increased.

According to embodiments, the method comprises computing a heat map from the noise-reduced marker image and identifying local maxima in the heat map. The method further comprises applying an intensity threshold algorithm on the local maxima for identifying the fields of view as the ones of the local intensity maxima having the highest intensity values.

According to embodiments the method further comprising generating the tissue mask by:
- generating, by the image analysis system, a luminance image from the image from which at least one of the marker images and/or the tumor image is derived, each pixel in the luminance image having assigned a luminance value derived from its R, G- and B intensity values;
- generating, by the image analysis system, a luminance variance image, each pixel in the luminance variance image having assigned a data value being indicative of the variance of luminance in the neighborhood of said pixel;
- applying, by the image analysis system, a threshold filter on the luminance variance image for generating a threshold-filtered, binary image that masks all pixels whose assigned data value indicative of the variance of luminance in the neighborhood are below a luminance variability threshold; and using the threshold-filtered, binary image as the tissue mask for masking pixel regions of low luminance variability as non-tissue regions.

According to embodiments, the method further comprises:
- generating, by the image analysis system, a luminance median image from the image from which at least one of the marker images and/or the tumor image is derived, each pixel in the luminance median image having assigned a data value being indicative of the median of the luminance values of pixels in the neighborhood of said pixel;
- applying, by the image analysis system, a threshold filter on the luminance median image for generating a further threshold-filtered, binary image that masks all pixels whose assigned data value indicative of the median of luminance in the neighborhood is above a median-luminance threshold;
- combining the threshold-filtered, binary image and the further threshold-filtered binary image for providing the tissue mask, the tissue mask masking pixel regions of low luminance variability as non-tissue regions and masking pixel regions with a median luminance above a median-luminance threshold, e.g. to mask artifacts having high luminance values.

According to embodiments, the method comprises generating the marker images by applying a color unmixing procedure on a single multiplex slide comprising a tumor tissue section, each color channel corresponding to one of the immune cell markers. Alternatively, the method comprises generating the marker images by taking an image from each of a plurality of single stain slides respectively comprising one of multiple adjacent tumor tissue sections and respectively being stained by a different one of the immune cell markers.

According to embodiments, the method further comprises providing a user interface.

According to some embodiments, the user interface is configured to enable a user to select the two or more marker images. The registering of the field of views is selectively performed for marker images selected by the user.

Allowing a user to specifically select two or more marker images which may be displayed on a screen in the form of an overlay may be advantageous as the user is enabled to check if, for example, two or more immune cell markers assumed to correlate and to be indicative of the same type of immune cell are indeed located in the common coordinate system in the same tumor region or not. In addition, or alternatively, the overlay image may display and indicate the location of multiple different immune cell types in the context of various tumors.

In addition or alternatively, the user interface enables a user to select two or more of the tumor region types, the identification of the FOVS being selectively performed for tumor regions of the selected two or more tumor region types.

In addition or alternatively, the user interface is configured to display the fields of views of the two or more marker images and the regions of the tumor image comprising said fields of views as an overlay of the tumor image and the two or more marker images. The overlay is displayed on a display screen. The user interface enables a user to zoom in and out on the two or more marker images or the heat maps generated therefrom, thereby increasing or decreasing the size of the displayed fields of views of the marker image and the regions of the tumor image.

According to some embodiments, the user interface is configured to enable a user to specify the number K of pixel areas to be identified in the heat map of each of the two or more marker images.

The user interface can be, for example, a graphical user interface displayed on a LCD monitor or on a touch screen.

According to embodiments, the immune score calculation comprises counting the number of immune cells in one or more of the FOVs identified in two or more of the marker images.

According to other embodiments, the immune score calculation comprises mapping the FOVs identified in the respective marker images to generate final FOVs. The mapping may comprise overlaying the FOVs of the marker images and performing a merging operation, e.g. a UNION or INTERSECT operation, thereby generating the final FOVs which completely or partially comprise the individual, original FOVs from which the final FOVs were generated. The original FOVs may also be referred to as "candidate FOVs". The mapping may be performed e.g. by registering all marker images to a common coordinate system or may be performed by aligning the marker images or parts thereof based on a morphological similarity (and thus without mapping the whole marker images to a common coordinate system). After having computed the final FOVs by the image analysis system, said final FOVS are mapped back to the coordinate system of the individual marker images. The final FOVs will typically overlap with but not be identical to the original FOVs in each of the marker images. Then, the final FOVs (and not the original FOVS identified in the respective marker images) are used for counting the immune cells in the individual marker images. In other words, the final FOVs are used as the FOVs in which the immune cells in the individual marker images are counted. The immune score is computed as a derivative of the immune cell counts in the (original or here: final) FOVs in the marker images. Using the final FOVs for counting cells may have the advantage that in all marker images, the same areas (the final FOVS resulting from a merging or intersection of the original (or "candidate") FOVS) are evaluated for determining the immune cell count. This may increase accuracy and reproducibility of the score calculation and may ease the calculation of relative amounts of immune cell types in a given area.

According to embodiments of the invention, the method comprises inputting immune cell counts and/or immune cell density and/or the immune score calculated for one or more of the FOVs and information on the type of tumor-related regions comprising said FOVs as input—together with known health parameters, e.g. month of disease free survival, for training a machine learning algorithm. The trained machine learning algorithm is used for automated tumor staging and tumor progression prognosis. This may be advantageous as the trained classifier will provide prognostic results having a higher accuracy of prediction thanks to the reproducible and non-biased way of selecting FOVs and counting immune cells contained therein.

In a further aspect, the invention relates to an image analysis system for automatic immune score computation. The system comprises a processor and memory. The memory comprises interpretable instructions which, when executed by the processor, cause the processor to perform a method comprising:

reading multiple marker images from memory, the pixel intensities of each marker image corresponding to the amount of a respective immune cell marker on a slide used for generating said marker image, each of the multiple marker images corresponding to a different immune cell marker;

computing a tumor image by processing an input image, the input image depicting the same tissue section as the tissue section depicted by the multiple marker images or depicting a tissue section adjacent to one of the tissue sections depicted by the multiple marker images, the tumor image selectively indicating tumor cells contained in one or more tumors;

identifying one or more regions in the tumor image, each identified region belonging to one of a plurality of predefined, cancer-type specific regions within or at the periphery of the one or more tumors;

registering two or more of the marker images and the tumor image to a common coordinate system if the two or more of the marker images and the tumor image originate in different coordinate systems;

for each of the two or more marker images, identifying fields of view in said marker image by:
    a) using each of the mapped regions within the marker image as a field of view of the marker image; or
    b) processing the marker image for identifying pixel areas are local intensity maxima within the marker image and which lie within one of the identified regions of the tumor image in the common coordinate system; and using the identified pixel areas as the fields of view of said marker image;

the method further comprising:

calculating an immune score, thereby selectively using image information derived from all fields of views of the two or more registered marker images as input.

An "immune score" as used herein is a score value that can be used as a prognostic factor for tumor development and that is indicative of various features of an organism's immune response to a tumor.

A "marker" or "biomarker" as used herein is a measurable indicator of some biological state or condition. In particular, a biomarker may be a protein or peptide, e.g. a surface protein, that can be specifically stained and which is indicative of a biological feature of the cell, e.g. the cell type or the physiological state of the cell. An immune cell marker is a biomarker that is selectively indicative of a feature that relates to an immune response of a mammal.

A "tumor" as used herein is a cluster of tumor cells. Tumor cells are characterized by an abnormal growth compared to cells of the body tissue from which the tumor is made of. Thus, a tumor cell may be a malignant cancer cell of some cancer type, but may also be a non-malignant cell of a benign tissue lump or swelling. For example, a tumor may be automatically identified as a blob of pixels whose intensity value is above a predefined threshold.

A "region related to a tumor" as used herein is either a region within a tumor (a so called "intra-tumor region" or "inner-tumor region") or a peri-tumor region (i.e., a region outside of and directly adjacent to the tumor, also referred to as the "periphery of a tumor").

A "blob" or "pixel blob" as used herein is a region in a digital image that differs in properties, such as brightness or color, compared to surrounding regions. For example, a blob may be a set of adjacent pixels having a particular intensity value range. Some of the blobs may be classified as "object candidates". Blobs may be detected, for example, by differential methods, which are based on derivatives of the function with respect to position, and methods based on local extrema, which are based on finding the local maxima and minima of the function. According to embodiments, blob detection is used to obtain regions of interest for further processing.

A "field of view" or "FOV" as used herein is a region in a digital image that is used for further manual or automated inspection and analysis. The FOV may be selected automatically or manually by analyzing some features of the digital image, e.g. by evaluating intensity values of the pixels of the digital image.

An "image analysis system" as used herein is an automatic system automatically evaluating digital images taken from a biological sample, e.g. a slide comprising a tissue section. It comprises a processor and memory and is operatively coupled to a device for capturing digital images, e.g. a camera, a microscope or a slide scanner and/or to a storage medium having stored the digital images. The image analysis system comprises digital, electronic instructions configured for analyzing one or more digital images for computing an immune score. Thus, the image analysis system as used herein may also be referred to as "immune score system".

A "mask" as used herein is a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

In a further aspect, a computer-implemented method is disclosed for a tumor region based immune score computation workflow. The workflow involves identifying regions, for example, tumor areas or regions around a tumor area, partitioning a whole slide image or portion of a whole slide image into multiple regions related to the tumor, selecting FOVs based on the density of each cell marker or stain, present in the image, within each identified region, and computing a number of cells present in each FOV. More specifically, the computer-implemented workflow for tumor region based immune score computation, in accordance with the present invention, involves reading images of individual markers or stains from an unmixed multiplex slide, or from multiple slides of serial sections, and computing a tumor region mask from the tumor marker image or hematoxylin and eosin (H&E) stained slide. Based on the size and location of each individual tumor cell cluster, a set of regions of interest are defined. The slide image (whole slide or portion thereof) is divided into multiple areas, i.e., according to the identified region, for example, the inter-tumor area, peri-tumor area and intra-tumor area. FIG. 4 shows an example of a melanoma slide being partitioned into multiple regions. An inter-marker image registration algorithm is used to map the regions to each of the marker images respectively corresponding to immune-histochemistry (IHC) slides from serial sections of IHC slides with different markers. Registration is not required for marker images resulting from an unmixing of a multiplexed slide since all the markers are in the same coordinate system. A heat map of each marker image is determined by applying a low pass filter on an individual marker image channel from a single stain slide or the unmixed image of a multiplex slide, and selecting the top K highest intensity fields of view within each tumor based classified regions from the heat map as the candidate FOVs for each marker. Finally, automatic cell counting algorithm is applied to each FOV and generates counts for each type of immune cell. The automated tumor region based immune score computation workflow of the present invention has the advantages of being reproducible, unbiased to human readers and more efficient.

The computer-implemented method for automated tumor region based immune score computation, in accordance with embodiments of the present invention, has been described, for exemplary purposes, in connection with the identification of melanoma immune cells, and for use in melanoma immune score computations. However, the computer-implemented method for tumor region based FOV identification and cell counting, in accordance with the present invention, is applicable to any type of image of a biological specimen, and is applicable to making determinations of type, density and/or location for any type of cell or group of cells.

In a further aspect, the invention relates to a method which involves identifying regions, for example, tumor areas or regions around a tumor area, partitioning a whole slide image or portion of a whole slide image into multiple regions related to the tumor, selecting FOVs based on the density of each immune cell marker or stain present in a respective one of the marker images within each identified region, and computing a number of cells present in each FOV. An immune score and/or immune-related score is generated based on the cells counted in each FOV.

In embodiments of the present invention, a system automatically generates a region around locations (e.g., tumor regions) in an image corresponding to the presence or identification of melanoma in an image of a stained biological specimen or sample, for example in a Hematoxylin and Eosin (H&E) image. For instance, an input image is received or obtained by the system in accordance with embodiments of the present invention. If the image is of a single stain slide, the scanned image of the single stain slide of each marker is directly utilized in the workflow. A tumor mask is computed from, for example, the unmixed tumor marker channel of a multiplex image, a single stain slide with tumor staining, and/or an H&E slide by a tumor segmentation algorithm in accordance with embodiments of the present invention. The unmixed tumor marker channel of a multiplex image, the single stain slide with tumor staining, and/or the H&E slide analyzed by a tumor segmentation algorithm may also be referred to as "tumor image". The algorithm can be a thresholding based method for single channel tumor marker image or learning based method, for example when the image is an H&E image. A region map of the whole slide image (or portion thereof) is created by incorporating the tumor clusters' location and/or size information. For example, micro-metastasis and macro-metastasis regions are defined based on the size of the tumor and periphery regions are defined based on their distances to the tumor locations.

When the input to a system, in accordance with the present invention, is a set of serial sections of slides, for example IHC slides, an inter-marker image registration algorithm (i.e., a process of aligning multiple different digital images to each other in a single coordinate system) is used to map the labeled regions (for example tumor regions) to each of the IHC slides from serial sections of IHC slides with different immune cell markers. Registration requiring creation of a common coordinate system is not required for the unmixed images of a multiplexed slide, as when the image is unmixed, all the marker channels are in the same coordinate system. Creation of a common coordinate system is required, during the registration process, when the individual slides, for example, IHC slides are not serial tissue sections.

The input image may include annotations that were manually added to the image (for example, annotations made to the image via a user interface, annotations made manually to an image with a marker, and then reimaged with the annotations made with the marker), or annotations that were electronically added to the image prior to being received by the imaging system of the present invention. Alternatively, the system of the present invention automatically annotates the image or allows a user to electronically annotate the input image after the image has been received.

In embodiments of the present invention, the annotations, whether they are manually or automatically added to the image before or after the image is input to a system or method of the present invention, are generated around regions that contain melanoma, for example, tumor regions containing melanoma. In an embodiment of the present invention locations of regions of interest in the image, for example, tumor regions such as melanoma tumor regions, is stored in the reference database and retrieved, such that the location of the regions of interest may be identified in the received or obtained image.

According to embodiments of the present invention, after some regions (e.g., melanoma tumor regions) are identified, the one or more melanoma regions are measured. Based on the size of the melanoma tumor region or regions that are measured, embodiments of the present invention automatically identify additional regions around (in the periphery of) the melanoma tumor region. Said additional regions may be referred to as "expanded or extended regions".

In embodiments of the present invention, fields of view generated in different images, for example, images of serial tissue sections stained with same or different stains, are registered in a single image. For example, in embodiments of the present invention, FOVs of H&E images are registered in a same coordinate system or image with FOVs identified in an IHC image. In other embodiments of the present invention, FOVs identified in individual color channel images (e.g., individual marker channel images), derived from an image of a biological specimen (e.g., a tissue sample) stained with a multiplex assay, are registered in a single one of the images, merged, and/or registered in a same coordinate system. For example, as shown in FIG. 14, a 5plex slide 1414, for example, is utilized as the reference coordinate system other slides are aligned to it. For example, the FOVs of selected marker images 1410, 1412, 1416, 1418 (respectively corresponding to an immune cell marker, e.g. FP3 for marker image 1410 and CD8 for marker image 1418) are then mapped from the aligned individual marker image to a common space or coordinate system, and then merged using morphological operations, such as union and intersection to obtain the merged FOVs, as shown in FIG. 14. For scanned images from a serial section of slides, an inverse registration (i.e., a registration that involves aligning the common coordinate system back to the original coordinate system of the respective original marker image) is needed to transfer the FOVs in the common coordinate system back to the original coordinate system of their respective marker image. Then, all FOVs of all different markers may be overlaid with each marker image to provide an overlay image that accurately depicts the distribution of the respective marker in the tissue context of said marker image.

After the fields of view are generated, a certain number of FOVs may be selected. The selected FOVs are in the annotated inner-tumor regions and/or the annotated extended regions at the tumor periphery. In embodiments of the present invention, the systems and methods of the present invention count immune cells that are targeted by a particular stain that selectively stains a respective immune cell marker. For example, after the FOVs are selected, for example, CD3+, CD8+, CD20+, and FoxP3+ stained cells or other cells positively stained by an immune cell marker may be automatically counted by the image analysis system in each of the fields of views. In addition, according to embodiments, the tumor cells in the tumor image within the FOVs mapped to the tumor image may be counted in each of the FOVs and/or tumor regions separately. The region-specific tumor cell count and respective marker-positive immune cell count may be compared for calculating a tumor region specific immune cell density. In some embodiment, the density of immune cells of a particular type In embodiments of the present invention, the generated cell counts are utilized to generate an immune score. For example, an immune score computation is generated based on the count of the cells in the one or more selected FOVS. The present invention has the benefit of generating a cell count that reflects the activity of immune cells external to the tumor (i.e., in the periphery of the tumor and/or in an invasive margin associated with the tumor) and of the activity of immune cells within the one or more tumors (i.e., internal and/or on a boundary of the identified one or more annotated tumors). The methods and systems of the present invention identify specific region sizes, relative to melanoma tumor sizes, that generate medically relevant data, for example cell counts not only a tumor region, but in the medically significant periphery of the tumor region. In embodiments of the present invention, the biological specimen is stained with one or more stains that target immune cells.

In a further aspect, the invention relates to a computer-implemented workflow for automatic immune score computation, comprising:
a) reading original individual marker images from at least one of an unmixed multiplex slide and single stain slides;
b) computing a tissue region mask from each of the original the individual marker images;
c) computing a tumor region mask from a tumor marker image, wherein the tumor marker image is a whole slide image;
d) assigning labels based on the tumor region in the whole slide image;
e) generating a heat map of each marker by applying a low pass filter on each of the individual marker images;
f) selecting a high intensity region from each of the heat maps generated as candidate FOVs for each marker within each region;
g) merging the candidate FOVs from each of the individual marker images by at least one of adding all of them together and only adding the ones from selected marker images;
h) registering each of the individual marker images to a common coordinate system; and
i) transferring the candidate FOVs back to each of the original individual marker images.

In a further aspect, the invention relates to a computer-implemented system for automatic FOV selection, comprising:
a) loading a list of image folders, wherein each image folder contains images for a single case;
b) displaying t heat maps for all markers in each of the images, wherein a user can simultaneously zoom in and out on the heat maps to view corresponding regions between the images;
c) displaying maps of the regions;
d) receiving an input corresponding to a number of FOVs from one or more of the images;
e) integrating the FOVs received into a single image; and
f) outputting the single image that integrates the FOVs received to a user interface.

In a further aspect, the invention relates to a computer-implemented workflow for automatic immune score computation, comprising:
a) reading original individual marker images from at least one of an unmixed multiplex slide and single stain slides;
b) computing a tissue region mask from each of the individual marker images;
c) computing a tumor region mask from a tumor marker image, wherein the tumor marker image is a whole slide image;
d) assigning labels to regions and generating labeled regions based on region in the whole slide image;
e) designating the labeled regions as FOVs;
f) merging the candidate FOVs from each of the individual marker images by at least one of adding all of them together and only adding the ones from selected marker images;
g) registering each of the individual marker images to a common coordinate system; and
h) transferring the candidate FOVs back to each of the original individual marker images.

DETAILED DESCRIPTION

The following detailed description refers to the accompanying drawings. The same reference numbers in different drawings may identify the same or similar elements. Systems, apparatuses, and methods of the present invention, relate to images of biological specimens that have been stained with stains or dyes (for example, chromogenic dyes, fluorescent stains, or quantum dots), to identify structures (for example, biomarkers being indicative of immune cells of a particular type). Examples of biomarkers being—alone or in combination with other biomarkers—identify immune cells of a particular type are CD3, CD8, CD20, and FoxP3).

For example, CD3 may be used as a biomarker indicating the presence of T cells and FoxP3 is a biomarker indicating the presence of regulatory T cells ("Tregs"). A H&E stained image may be used for identifying tumor (melanoma) cells, thereby generating a tumor image.

The subject disclosure presents systems and methods for identifying one or more medically significant FOVs that are generated in the expanded regions and/or the identified tumor regions. In embodiments of the present invention, the image analysis system associated each identified tumor-related region in the tumor image (inner-tumor region as well as regions at the tumor periphery) with an annotation. The annotation indicates the type of the tumor-related region. The present invention has the benefit of generating a cell count that reflects relevant activity of cells external to one or more identified tumor regions, as well as cells of the one or more identified tumor regions. The methods and systems of the present invention identify specific amounts by which to extend the tumor region (i.e., extended regions), and generate medically relevant data, for example immune scores. The terms image and image data are used interchangeably herein.

While embodiments of this invention are described with respect to images of DAB and hematoxylin (HTX) stained slides, and/or IHC slides, the methods of the present invention may also be applicable to other images of biological specimens (e.g., images of biological specimens stained with fluorescent and non-fluorescent dyes or stains (e.g., chromogenic dyes). The dyes may be used to selectively identify biomarkers being indicative of a particular immune cell type, such as CD3, CD8, CD 20 and/or FoxP3) and other biomarker types (used e.g. for ISH images). The terms unmixing and color deconvolution are used interchangeably herein.

The present invention is described, for exemplary purposes, in connection with cancerous tissue. However, the present invention is applicable to any biological specimen, for example a tissue specimen or cytology specimen, and/or applicable to biological specimens of any disease state (e.g., cancerous or non-cancerous). Additionally, one of ordinary skill in the art would recognize that the order of steps performed may vary.

Figure 1:
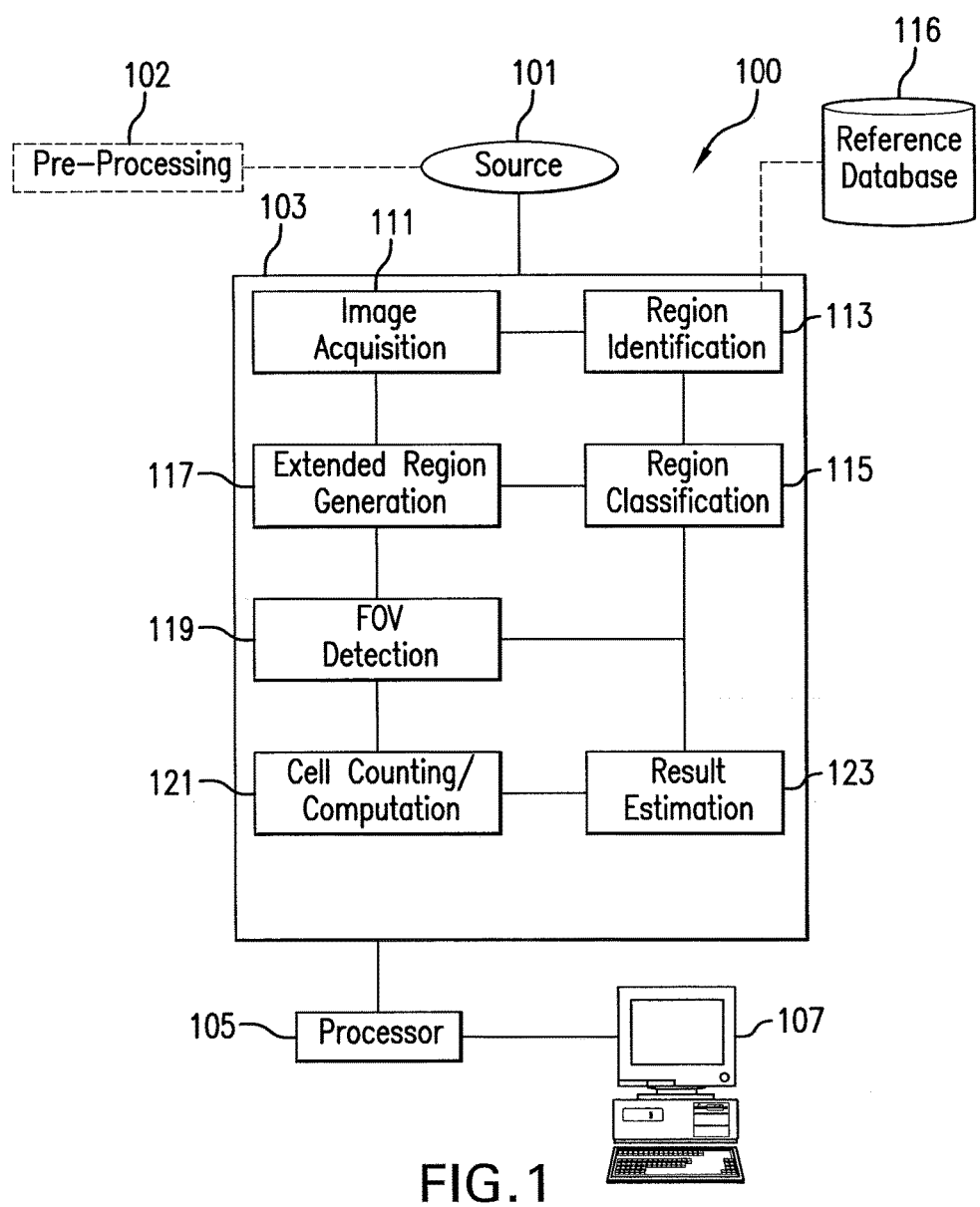
FIG. 1 illustrates a block diagram of image analysis system in accordance with embodiments of the present invention.

FIG. 1 illustrates a system 100, for example, an image analysis system for automatically identifying fields of view (FOVs) for regions in an image encompassing tumors, for example, melanoma, in accordance with an embodiment of the present invention. The identified FOVs may be used for computing immune scores.

System 100 comprises a source 101 for generating an image, for example a multi-channel image or multi-channel image data (for example, an RGB image or RGB image data and/or a multispectral image or multispectral image data). For purposes of describing the present invention, the source 101 generates at least one (H&E) image and one (IHC) image. However, the source may generate on or more H&E images, IHC images, and/or other images or image types, in particular marker images for various immune cell markers. For instance, source 101 may be or include a fluorescence microscope, camera, optical, scanner, CCD, or imaging system that generates a fluorescent image, or a bright-field microscope, camera, optical scanner, or imaging system generating an RGB image, multispectral image, and/or RGB or multispectral image data. Examples of imaging systems can be, for example, any fluorescent or a brightfield microscope with spectral filter wheel or a whole slide scanner. Source 101 is in communication with a memory 103, which includes a plurality of processing modules or logical operations that are executed by processor 105 coupled to interface 107. For instance, a sample, such as a biological specimen, may be mounted on a slide or other substrate or device for purposes of imaging by a microscope, camera, scanner, CCD, or other optical system coupled to memory 103, with analysis of images of the specimen being performed by processor 105 executing one or more of the plurality of modules stored on memory 103 in accordance with the present disclosure. The analysis may be for purposes of identification and analysis of the specimen. For instance, a biological or pathological system may analyze the specimen for biological information, such as the presence of proteins, protein fragments or other markers indicative of cancer or other disease, or for other purposes such as genomic DNA detection, messenger RNA detection, protein detection, detection of viruses, detection of genes, or other.

The specimen, for example, a tissue specimen or cytology specimen may be stained by means of application of one or more different stains that may contain one or more different quantum dots, fluorophore(s), or other stains. For example, in a fluorescent slide, the different stains may correspond to different quantum dots and/or fluorophores. The fluorophores may comprise one or more nano-crystalline semiconductor fluorophores (e.g., quantum dots), each producing a peak luminescent response in a different range of wavelengths. Quantum dots are well known, and may be commercially available from Invitrogen Corp., Evident Technologies, and others. For example, the specimen may be treated with several different quantum dots, which respectively produce a peak luminescent response at 565, 585, 605, and 655 nm. One or more of the fluorophores applied to the specimen may be organic fluorophores 14 (e.g., DAPI, Texas Red), which are well known in the art, and are described in at least commonly-owned and assigned U.S. Pat. No. 8,290,236, the contents of which are incorporated by reference herein in their entirety. Moreover, a typical specimen is processed utilizing a staining/assay platform, which may be automated, that applies a stain, for example, a stain containing quantum dots and/or organic fluorophores to the specimen. There are a variety of commercial products on the market suitable for use as the staining/assay platform.

After preliminary tissue processing and staining, one or more digital images of the specimen may be captured at source 101 via, for instance, a scanner, CCD array spectral camera, or other imaging system that is used for imaging a slide containing a sample of a material, and generate a digital image of the sample on the slide. The slide containing the sample is subjected to a light source for illuminating the specimen at wavelengths intended to produce a luminescent response from the stain applied to the specimen. In the case of quantum dots, the light source may be a broad spectrum light source. Alternatively, the light source may comprise a narrow band light source such as a laser. An RGB brightfield image may also be captured. The imaging system may include, for example, a digital camera, a microscope or other optical system having one or more objective lenses, and light sources, as well as a set of spectral filters. Other techniques for capturing images at different wavelengths may be used. Camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure. The image may be supplied to memory, or storage device 103, either via a wireless or wireline connection, for example, a cable connection between the source 101 and computer 107, via a computer network, or using any other medium that is commonly used to transfer digital information between computers. The image may also be supplied over the network to a network server or database for storage and later retrieval by computer 107. Besides processor 105 and memory 103, computer 107 also includes user input and output devices such as a keyboard, mouse, stylus, and a display/touchscreen. As will be explained in the following discussion, processor 105 executes modules stored on memory 103, performing analysis of the image, of the image or image data derived from such images, quantitative analysis, and display of quantitative/graphical results to a user operating computer 1.

According to embodiments, modules stored on memory 103 include image acquisition module 111, a region identification module 113, a region classification module 115, region generation module 117, a reference database 116 for storing reference or other data, FOV detection module 119, a cell counting and/or computation module 121, and a result determination or estimation module 123. A "module" as understood herein encompasses a program module that comprises instructions that are executable by a processor. The operations performed by these modules are not limited to those described herein, and the sequence, arrangement, and total number of modules may vary, with the presently described embodiment being solely for example purposes. The modules may be implemented in hardware, firmware or software or a mixture thereof.

For instance, the image acquisition module 111 receives an input image or image data from the source 101.

The received image may be a digital image wherein a tumor-specific biomarker, e.g. a marker for melanoma cells, is selectively stained and represented in the form of pixel having high intensity values. Thus, the received image may be a tumor image in which the tumor cells are selectively stained or any other digital image of a tissue slide comprising sufficient information for enabling the image analysis system 100 to automatically identify the tumor cells and cell clusters in the input image.

In embodiments of the present invention, the region identification module 113 receives location data input by a user or automatically generated that is associated with the one or more tumors. In embodiments of the present invention, the region identification module creates a tumor mask, by for example using a segmentation algorithm and/or a thresholding process. If the input image is of a single stain slide, the scanned image of the single stain slide of the marker is directly utilized in the workflow.

A tumor mask is computed from, for example, the unmixed tumor marker channel image derived by spectral unmixing of a multiplex image. Alternatively, the tumor image depicts an H&E slide wherein tumor cells were selectively identified and highlighted by a tumor segmentation algorithm in accordance with embodiments of the present invention. The segmentation algorithm utilized may be, for example, a thresholding based method for single channel tumor marker image or learning based method, for example when the image is an H&E image.

In embodiments of the present invention, region locations, measurement data and/or region-type labels ("annotation data") of intra-tumor regions obtained by the modules 113, 115 and 117 is stored in the reference database 116. Alternatively, the received tumor image may already comprise or be annotated with tumor region locations, measurement data and/or region-type labels ("annotation data") of intra-tumor regions and the modules 113, 115 and 117 may retrieve and/or utilize said information.

In embodiments of the present invention, the stored data representing the location of the tumor regions identified in the H&E image, is mapped or registered in each of a plurality of marker images, e.g. images derived from an IHC slide stained with a respective marker-specific stain. If a set of input images (e.g., IHC images) are received as the marker images, the location of the tumor regions identified in the H&E image acting as tumor image and is mapped or registered in each of the marker images (and corresponding IHC slides). In exemplary embodiments of the present invention, the tissue regions are identified in an IHC slide and/or mapped or registered in other IHC slides or H&E slides, if any.

Region identification module 113, identify regions, for example, regions within and at the periphery of cell clusters (e.g., cell clusters in the tumor image). For example, regions may have assigned annotations that were made to the image of a slide manually or automatically and that are indicative of the region type. For example, the input image may be provided by another image analysis system and may already comprise some annotated tumor regions or location information of tumor regions. In embodiments of the present invention, the region identification module 113 automatically creates a tumor mask from the tumor image, by for example using a segmentation algorithm and a thresholding process as depicted, for example, in FIG. 6. In embodiments of the present invention, the automatically identified regions within and at the periphery of the tumor are identified in an image of an H&E stained tissue sample. Preferentially, the tumor mask is applied on the tumor image before the tumor related regions are identified. The tumor mask filters out noise and image information not related to tumor cells, thereby reducing the consumption of computational resources when identifying and annotating the tumor regions.

The identification of the tumor-related regions is performed according to embodiments of the invention in a two-step approach: at first, the inner-tumor region identification module 113 identifies pixel blobs of high intensity values in the tumor image, e.g. by applying a threshold algorithm or by evaluating annotations and location information already comprised in the tumor image. Then, the region classification module 115 measures the size of each inner-tumor region identified in the tumor image (e.g., an H&E image or a tumor-specifically stained IHC image). In an exemplary embodiment of the present invention, the module 115 measures and/or labels the identified tumor regions with respective tumor region labels and generates a boundary around the identified inner-tumor regions. In a second step, the extended region generation module 117 generates extended region location data corresponding to regions in the periphery of the inner-tumor regions identified by module 113. For example, the region generation module 117 determines the size or diameter of the extended region based on data output by the module 115 (providing inner-tumor region labels). In an embodiment of the present invention, the region generation module 117 outputs the extended region, corresponding to a boundary around the annotated tumor to a display. The extended region is a region in the periphery of an inner-tumor region.

In embodiments of the present invention the extended region is displayed on a graphical user interface in form of a visual boundary or data corresponding to a boundary around an inner-tumor region surrounded by said extended region and by the outer boundary of the extended region. In embodiments of the present invention, region measurements optionally generated by the inner-tumor region identification module 113, and/or region labels (also referred to as annotations of the region type) generated by the region classification module 115 may be stored in the reference database and retrieved and utilized by the region generation module 117 for identifying the extended regions. The module 117 may store location information and the type of the generated extended regions in the reference database in the form of region labels. In embodiments of the present invention, the region measurements, and/or region labels of inner- and peri-tumor regions identified by modules 113, 115, 117 are stored in the reference database and retrieved and transferred to marker images when mapping or registering the tumor regions in said marker images (e.g., images of a set of IHC images for which FOVs are determined).

In embodiments of the present invention, a region map of the tumor image (which may depict a whole slide or portion thereof) is created by the region identification and generation modules 113, 115, 117, incorporating the tumor regions' location and/or size information. For example, micro-metastasis and macro-metastasis regions are defined based on the size of the tumor and periphery regions are defined based on their distances to the tumor locations.

The source 101 may be configured to acquire and provide a plurality of marker images having been obtained from differently stained, adjacent tissue sections or by means of unmixing a multiplex image. For example, the marker images may be received in the form of multiple IHC slide images of adjacent tissue sections, each slide having been stained with a different immune cell specific stain.

For a serial section of slides, an image registration algorithm implemented in the region identification module 113 is used according to embodiments of the invention to map the labeled tumor-related regions to each of a plurality of marker images. The marker images may be, for example, images derived from IHC slides from serial sections of IHC slides with different immune cell markers.

In embodiments of the present invention, locations information of tumor-related regions (in the inner and at the periphery of tumor cell clusters) and the respective region labels ("annotations") are stored in a reference database and are retrieved and/or utilized by the image registration module 514 later, e.g. for mapping the identified regions to the marker images for using this information for immune cell counting and/or score calculation.

In embodiments of the present invention, the stored data representing the location of the tumor regions identified in the H&E image, is mapped to each of the marker images or to a manually selected sub set of the marker images. If a set of marker images (derived e.g. from respective IHC images) are received, the location of the tumor regions identified in the H&E image is mapped to each of the marker images. The mapping may be performed after an image registration step that aligns the coordinate system of the marker images to the coordinate system of the masked tumor image. In exemplary embodiments of the present invention, the tumor-related regions are identified in a tumor image derived from an IHC slide and to marker images derived from other IHC slides or H&E slides of adjacent tissue sections.

The FOV detection module 119 receives the tumor region data and extended region data, and automatically identifies all or a plurality of "fields of view" (FOVs). In an embodiment of the present invention, the tumor-regions and extended tumor regions mapped to the respective marker images are used as FOVs. In other embodiments, the FOVs are identified as sub-areas within the respective tumor regions or extended tumor regions in dependence on the intensity of groups of pixels in a respective marker image. For example, the regions may be assigned a color (via creation of a heat map) and ranked according to the appearance and/or staining intensity of the groups of pixels (i.e., candidate FOVs) in the marker image of the biological sample.

In some embodiments, the number of cells are counted in some or all FOVs of a particular marker image and a particular tumor-related region. In some embodiments, only the cells in the K FOVs having the highest intensity values within a respective tumor related region are counted. The counting is performed according to embodiments of the invention by evaluating pixel intensity values if the marker image that correlates with the density of a particular marker in a slide and thus with the density of a particular immune cell identifiable via said marker.

In some other embodiments, the top K heat map intensity bins are selected and any pixels in the marker image whose intensity value is within the intensity range of a bin is included in the set of pixels analyzed for automatically counting the immune cells represented by said pixels.

The cell count computation module 121 detects high pixel intensity regions in the identified tumor regions or extratumor regions mapped to a marker image. Said high pixel intensity regions represent a high density of immune cells selectively identified via the marker of the analyzed marker image. In embodiments of the present invention, the FOV detection module automatically selects a certain number K of the identified FOVs.

In embodiments of the present invention, the intra-tumor regions and extended tumor regions may be ranked from high intensity regions to low intensity regions, and a predetermined number of regions may be selected as FOVs from the ranked regions, with the higher intensity regions being selected as FOVs over lower intensity regions. The high pixel intensity regions typically correspond to high cell density regions in the biological specimen.

In embodiments of the present invention, the cell counting and/or computation module 121 counts the cells in the selected FOVs. In embodiments of the present invention, the cell counting and/or computation module computes an immune score and/or an immune-related score.

Examples for the cell counts for the immune cell marker CD8 for different identified regions in tissue samples in accordance with an exemplary cohort study is given in the tables below.

CD8 Report for 9 Patients:

| Case Number | Isolated Melanoma Region Number | Isolated Melanoma Region Cell Count | Isolated Melanoma Region Area (mm^2) | Isolated Melanoma Region Cell Count per mm^2 | Macro-metastasis Region Number | Macro-metastasis Region Cell Count | Macro-metastasis Region Area (mm^2) | Macro-metastasis Region Cell Count per mm^2 |
|---|---|---|---|---|---|---|---|---|
| 06-13407 | 5 | 1 | 0.002418 | 413.597 | 2 | 10 | 0.25908 | 38.5981 |
| Jul 18 | 1 | 0 | 0.003601 | 0 | 1 | 31 | 0.31518 | 98.3566 |
| 07-14913 | 3 | 0 | 0.002165 | 0 | 0 | | | |
| Jul 62 | 1 | 1 | 0.001184 | 844.8176 | 0 | | | |
| Jun 11 | 0 | | | | 0 | | | |
| 07-3472-2 | 1 | 1 | 0.003387 | 295.2792 | 0 | | | |

| Case Number | | | | | | | | |
|---|---|---|---|---|---|---|---|---|
| 07-4511-9 | 0 | | | | 0 | | | |
| 07-14224- | 1 | 0 | 0.001241 | 0 | 0 | | | |
| 06-5162- | 7 | 3 | 0.004902 | 612.0575 | 0 | | | |

| Case Number | Micro-metastasis Region Number | Micro-metastasis Region Cell Count | Micro-metastasis Region Area (mm^2) | Micro-metastasis Region Cell Count per mm^2 | Micro-metastasis Region Number | Group of Isolated Melanoma Region Number | Group of Isolated Melanoma Region Cell Count | Group of Isolated Melanoma Region Area (mm^2) |
|---|---|---|---|---|---|---|---|---|
| 06-13407 | 7 | 3 | 0.02708 | 110.7813 | 2 | 2 | 1 | 0.003057 |
| Jul 18 | 0 | | | | 1 | 0 | | |
| 07-14913 | 1 | 0 | 0.020652 | 0 | 0 | 0 | | |
| Jul 62 | 0 | | | | 0 | 0 | | |
| Jun 11 | 1 | 20 | 0.055125 | 362.8114 | 0 | 0 | | |
| 07-3472-2 | 3 | 0 | 0.004047 | 0 | 0 | 0 | | |
| 07-4511-9 | 0 | | | | 0 | 0 | | |
| 07-14224- | 0 | | | | 0 | 0 | | |
| 06-5162- | 7 | 3 | 0.004902 | 612.0575 | 0 | 4 | 0 | 0.006714 |

| Case Number | Group of Isolated Melanoma Region Cell | Periphery of Isolated Melanoma Region Number | Periphery of Isolated Melanoma Region Cell Count | Periphery of Isolated Melanoma Region Area (mm^2) | Periphery of Isolated Melanoma Region Cell Count per mm^2 | Periphery of Macro-metastasis Region Number | Periphery of Macro-metastasis Region Cell Count | Periphery of Macro-metastasis Region Area (mm^2) |
|---|---|---|---|---|---|---|---|---|
| 06- | 327 | 3 | 71 | 0.34438 | 206.165 | 3 | 257 | 0.71796 |
| Jul 18 | | 1 | 316 | 0.33573 | 941.235 | 6 | 0 | 4.88E− |
| 07- | | 3 | 0 | 0.19537 | 0 | 0 | | |
| Jul 62 | | 1 | 376 | 0.46552 | 807.691 | 0 | | |
| Jun 11 | | 0 | | | | 0 | | |
| 07- | | 1 | 297 | 0.34967 | 849.375 | 0 | | |
| 07- | | 0 | | | | 0 | | |
| 07- | | 1 | 139 | 0.32328 | 429.963 | 0 | | |
| 06- | 0 | 2 | 212 | 0.50999 | 415.694 | 0 | | |

| Case Number | Periphery of Macro-metastasis Region Cell Count per mm^2 | Periphery of Micro-metastasis Region Number | Periphery of Micro-metastasis Region Cell Count | Periphery of Micro-metastasis Region Area (mm^2) | Periphery of Micro-metastasis Region Cell Count per mm^2 | Periphery of Group of Isolated Melanoma Region Number | Periphery of Group of Isolated Melanoma Region Cell Count | Periphery of Group of Isolated Melanoma Region Area (mm^2) | Periphery of Group of Isolated Melanoma Region Cell Count per mm^2 |
|---|---|---|---|---|---|---|---|---|---|
| 06- | 357.96 | 2 | 190 | 0.4957 | 383.26 | 1 | 422 | 0.5501 | 767.1 |
| Jul 18 | 0 | 0 | | | | 0 | | | |
| 07- | | 1 | 0 | 0.3927 | 0 | 0 | | | |
| Jul 62 | | 0 | | | | 0 | | | |
| Jun 11 | | 1 | 249 | 0.8501 | 292.88 | 0 | | | |
| 07- | | 1 | 467 | 0.4337 | 1076.6 | 0 | | | |
| 07- | | 0 | | | | 0 | | | |
| 07- | | 0 | | | | 0 | | | |
| 06- | | 1 | 302 | 0.8031 | 375.99 | 2 | 44 | 0.3948 | 111.4 |

In an embodiment of the present invention, the result estimation module 123 receives the cell count information from module 121 and computes an immune score or immune-related score, for one or more input FOVs. In embodiments of the present invention, the result estimation module 123 outputs the cell count and/or the immune score to a user interface or display, for example, a display associated with computer 107.

For example, in order to generate the data of the above tables, 40 macro-metastatic melanoma patient samples of 9 patients were stained by immunohistochemistry with individual immune cell markers CD3, CD20, CD8, FoxP3, and a tumor marker. The whole slides were scanned by the iScan HT scanning device. The image data was analyzed in accordance with the automated FOV and region detection method as described for embodiments of the invention and the output generated were individual counts and areas for the intra-tumor and peripheral region for the macro-metastasis and other region types. The cell counts for the marker CD8 is given below, the cell counts and derivative measurement parameters of the other markers CD3, CD20 and FP3 are computed by the image analysis system of embodiments of the invention analogously (not shown). For patients with more than 1 slide evaluation the mean for each parameter was calculated. The value 0.0 was considered as a value and not a missing data. For each parameter patients were divided in two groups: below median value (1602 in FIG. 16) and over median value (1601 in FIG. 16). Overall survival was measured from dissection date and P values were computed by applying the log-rank test and other statistical approaches on the cell count data of the markers. The result of the statistical analysis was used for computing multiple Kaplan Meier curves some of which are presented in FIG. 16.

Figure 16:
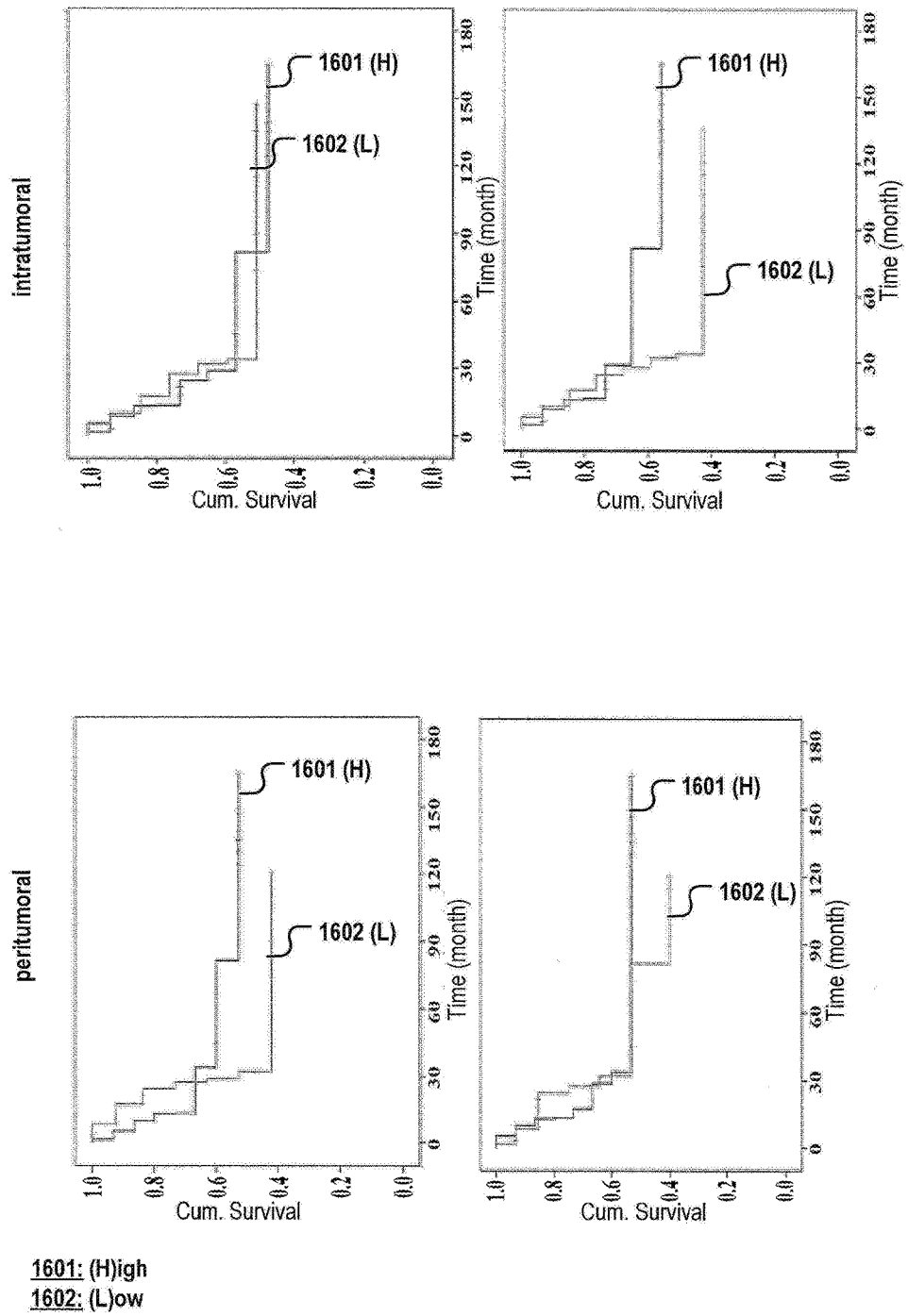
FIG. 16 illustrates Kaplan-Meier curves generated from immune cell distribution data in various intra- and peri-tumor regions.

According to some embodiments, the formula for estimating the Kaplan Meier curves of FIG. 16 is: $S(t)=$product for $t_i < t$ $(n_i - d_i)/n_i$, where t is time, $n_i$ are the patients at risk immediately before $t_i$ and $d_i$ the number of deaths at $t_i$. The median time is the time t corresponding to a value of $S(t)$ equal to 0.50.

According to embodiments, the absolute or relative amount of immune cells of a particular type (e.g. B cells, T cells and sub-types thereof) in a particular region together with additional automatically determined measurement data (size of the region, total number of cells or total number of tumor cells in the region) may be used for calculating one or more Kaplan-Meier curves being indicative of predicted survival rates and/or may be used for calculating an immune score.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage 103, which includes including random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
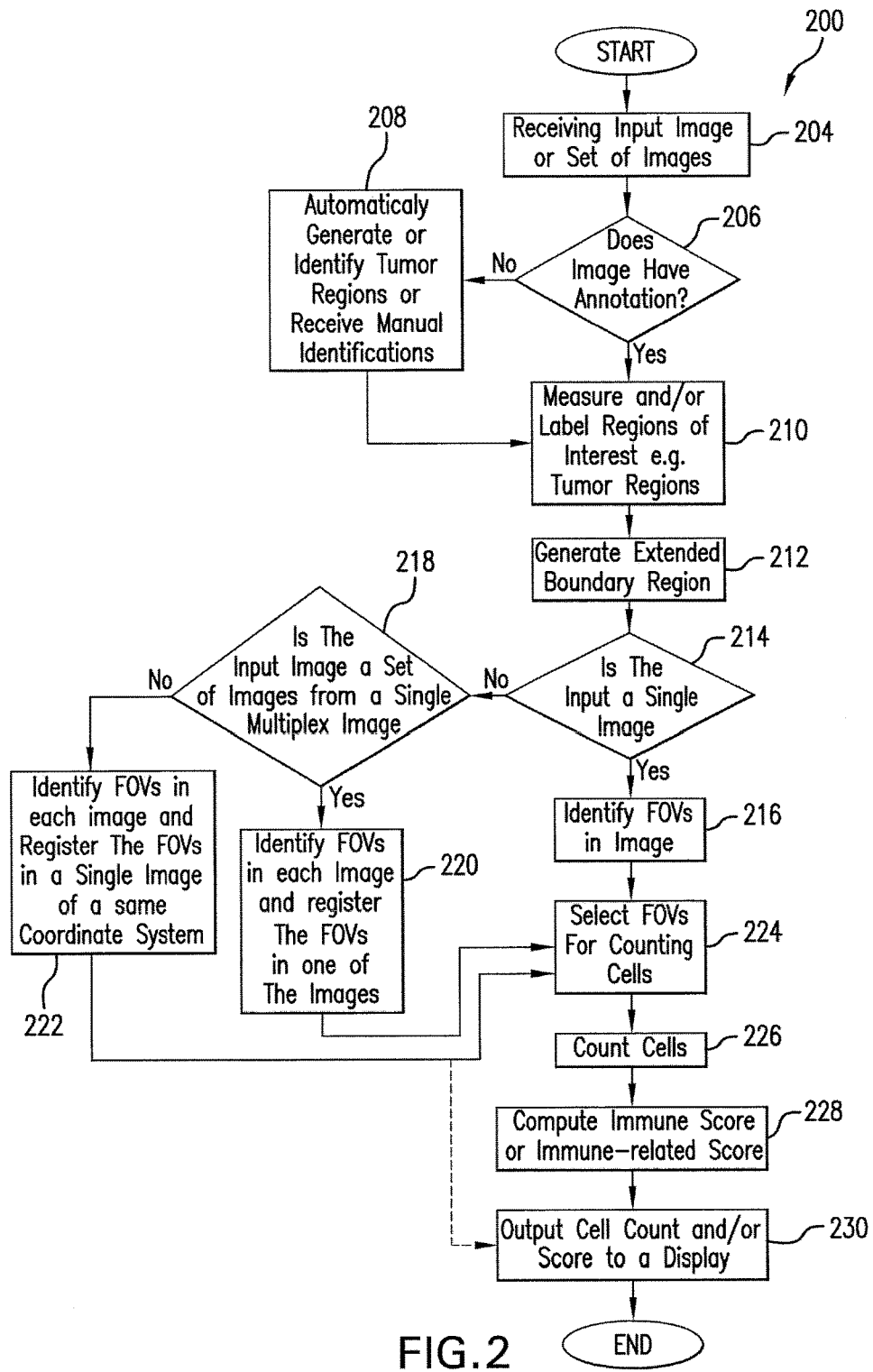
FIG. 2 illustrates flow chart of a method of image analysis in accordance with embodiments of the present invention.

An exemplary system and method for automatically identifying fields of view (FOVs) for regions in an image encompassing one or more tumors, for example melanoma tumors, in accordance with the present invention, is depicted in FIG. 2.

Figure 13:
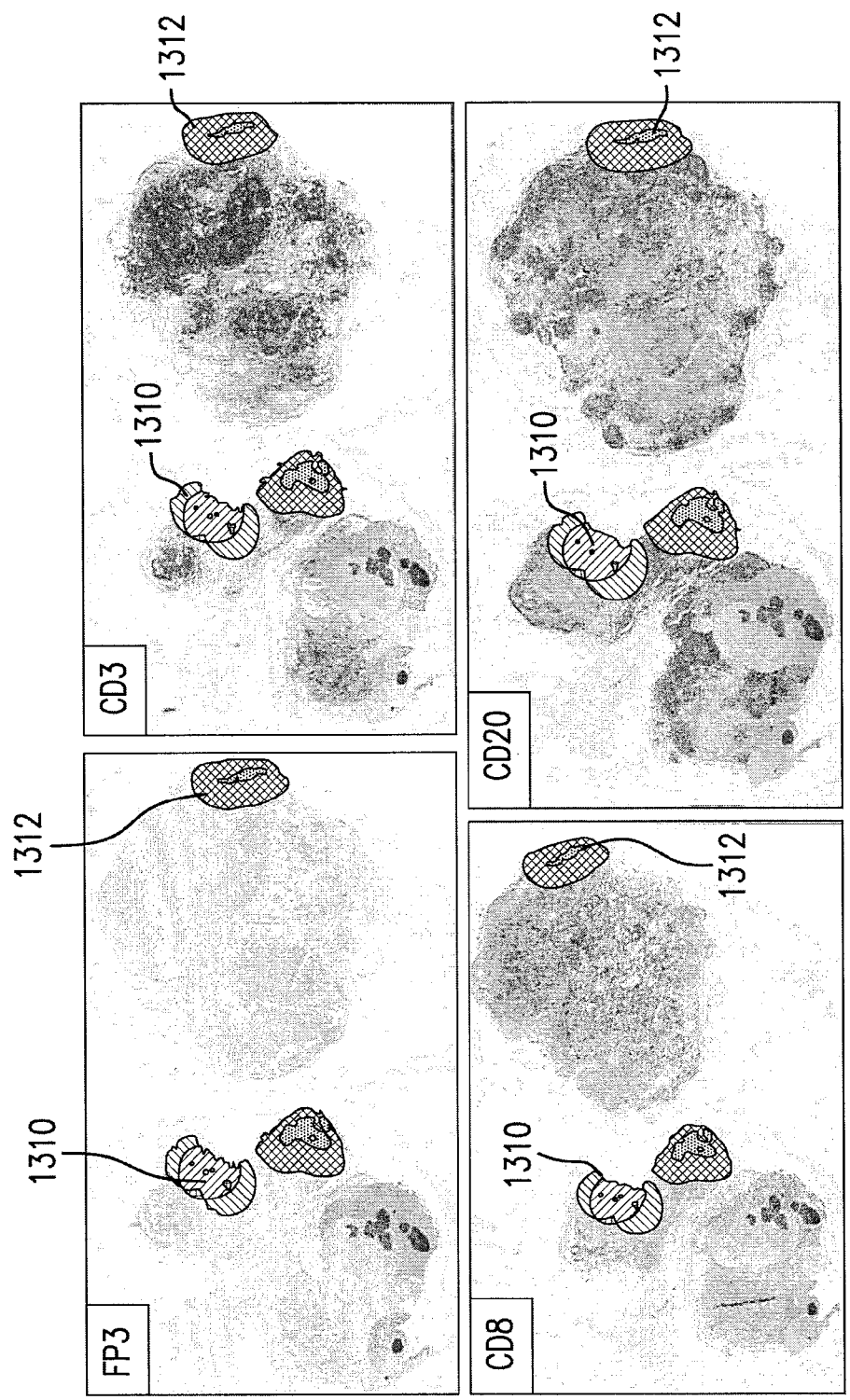
FIG. 13 illustrates an example of transferring region labels computed from the melanoma tumor marker channel image (MTC) to respective marker images of single stain slides, in accordance with embodiments of the present invention.

The method 200 involves, in step 204, receiving an input image (e.g., by the image acquisition module 111), such as, an RGB image, multispectral image, or an individual color channel image derived from a multispectral image, from a source. For example, in embodiments of the present invention, the input image is an H&E image or a tumor marker IHC slide image, and the identified regions (e.g., tumor regions) are identified or annotated in H&E image or a tumor marker IHC slide. The received image is a tumor image or is processed to generate a tumor image, i.e., a tumor that selectively highlights tumor cells, e.g. melanoma cells. FIG. 13 illustrates an example of transferring region labels, for example, regions 1310 and 1312, computed from the melanoma tumor marker channel image (MTC) (obtained, for example, via an H&E slide) to respective marker images (which may be derived from respective single stain slides), in accordance with the present invention.

In exemplary embodiments of the present invention, the intra-tumor regions) are manually annotated by a user or automatically generated by a segmentation algorithm, for example the segmentation algorithm described in PCT application WO2015/113895, entitled ADAPTIVE CLASSIFICATION FOR WHOLE SLIDE TISSUE SEGMENTATION, which is hereby incorporated by reference in its entirety. In general, PCT application WO2015/113895 segments tumor regions from other regions in an image by, for example, via operations related to classification of the regions that include identifying grid points in the tissue image, classifying the grid points as one of a plurality of tissue types, and generating classified grid points based on a database of known characteristics of tissue types, assigning the classified grid points at least one of a high confidence score and a low confidence score, modifying a database of known characteristics of tissue types based on the grid points that were assigned a high confidence score, and generating a modified database, and reclassifying the grid points that were assigned a low confidence score based on the modified database, to segment the tissue (e.g., identify tissue regions in an image).

Alternatively, the intra-tumor regions may be determined by the systems and methods disclosed in PCT application PCT/EP2015062015, entitled AN IMAGE PROCESSING METHOD AND SYSTEM FOR ANALYZING A MULTI-CHANNEL IMAGE OBTAINED FROM A BIOLOGICAL TISSUE SAMPLE BEING STAINED BY MULTIPLE STAINS, which is hereby incorporated by reference in its entirety. PCT/EP2015062015 discloses methods for identifying tumor regions in an image of a single stained image or a multichannel image (e.g., an image of a biological specimen stained with a multiplex assay. PCT/EP2015062015 includes unmixing operations when the input image is a multichannel image. In general, PCT/EP2015062015, with reference to FIGS. 5 and 6, identifies tumor regions with operations comprising, for example, reading an image, for example, a high resolution input image 631 from the image acquisition system 502,111, computing or receiving a low resolution version of the high resolution input image 631, reading a plurality of low resolution image marker images from the image acquisition system 111, wherein each image marker image is of a single color channel 632 of the low resolution input image, computing a tissue region mask corresponding to the low resolution input image. However, other methods of segmentation may be utilized, in other embodiments of the present invention. In embodiments of the present invention, the tumor regions are identified via a segmentation or thresholding method or algorithm of the pre-processing module 102. In embodiments of the present invention, the pre-processing modules are located in a computing system or memory that is different from the memory or storage 103.

In step 206, it is determined by module 113 whether one or more intra-tumor regions are already present in the tumor image of the biological specimen, by, for example, annotations or annotation data, which are already present or associated with the image, that denote intra- or extended tumor regions. If annotations or annotation data, are not associated with the input tumor image, intra-tumor regions are annotated or located in the tumor image automatically in step 208 via, for example, the methods disclosed in PCT application WO2015/113895, entitled which is hereby incorporated by reference in its entirety. In other embodiments of the present invention, in step 208, the intra-tumor regions are annotated manually.

In step 210, the identified intra-tumor region or regions are measured, by, for example, the region classification module 115 and the region measurements are stored in a storage or memory 103. The measuring may comprise identifying pixel blobs in the tumor image whose intensity values exceed a predefined threshold (and are considered to represent tumor cells and tumor cell clusters), determining the size, largest diameter and/or shape of the pixel blob. The measurement information obtained in step 210, e.g. the diameter, size, number of pixels, shape, the type of the intra-tumor region and/or other features of the identified intra-tumor region in the tumor image is evaluated for automatically generating extended tumor regions in step 212 by the module 117.

In embodiments, of the present invention, the region classification module 115 labels and/or measures the regions of interest, and the labels and/or measurements are stored in memory 103 and/or a non-volatile database 116.

Figure 4:
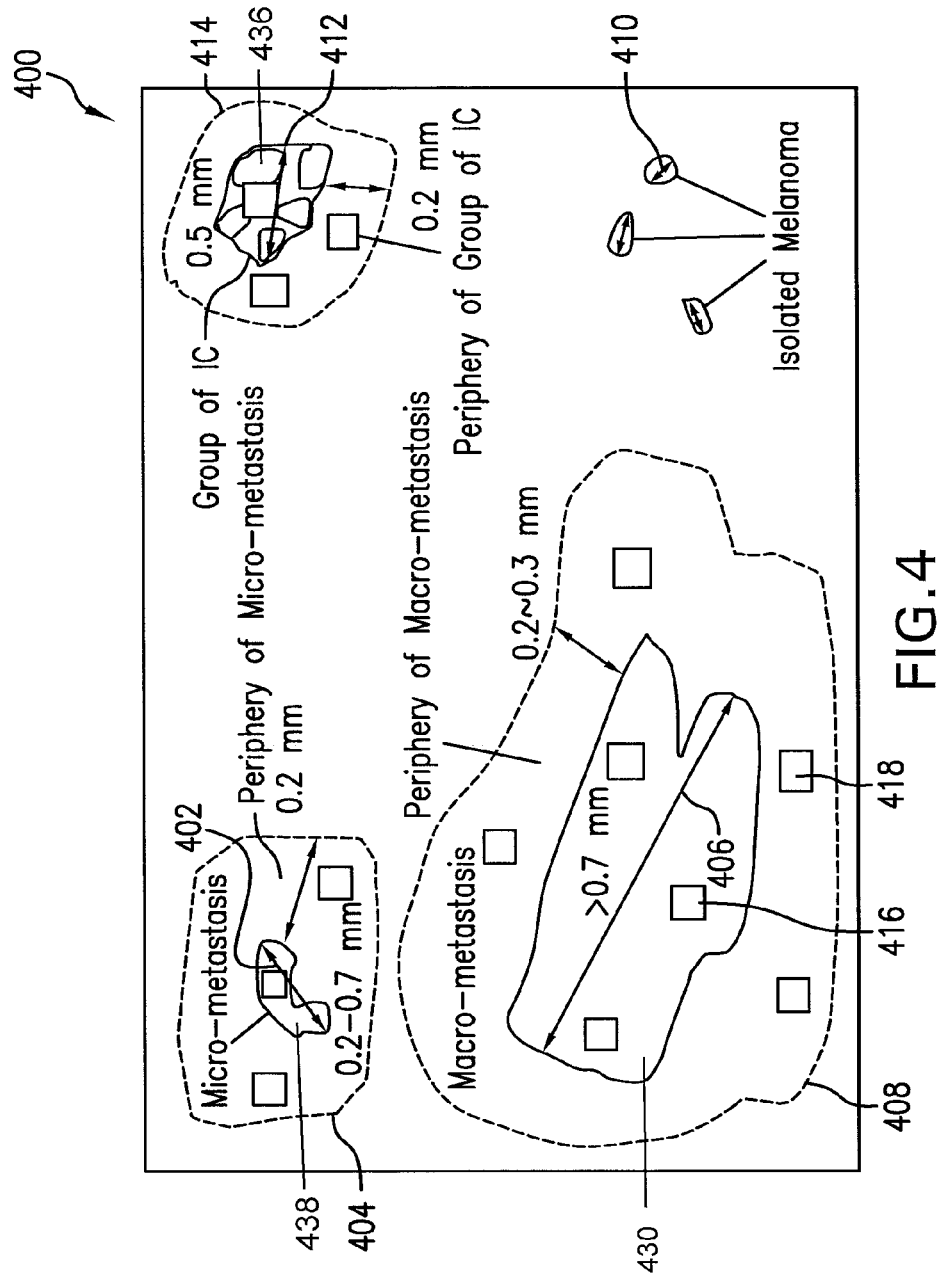
FIG. 4 illustrates an annotated tumor image derived from methods in accordance with the present invention.
Figure 8:
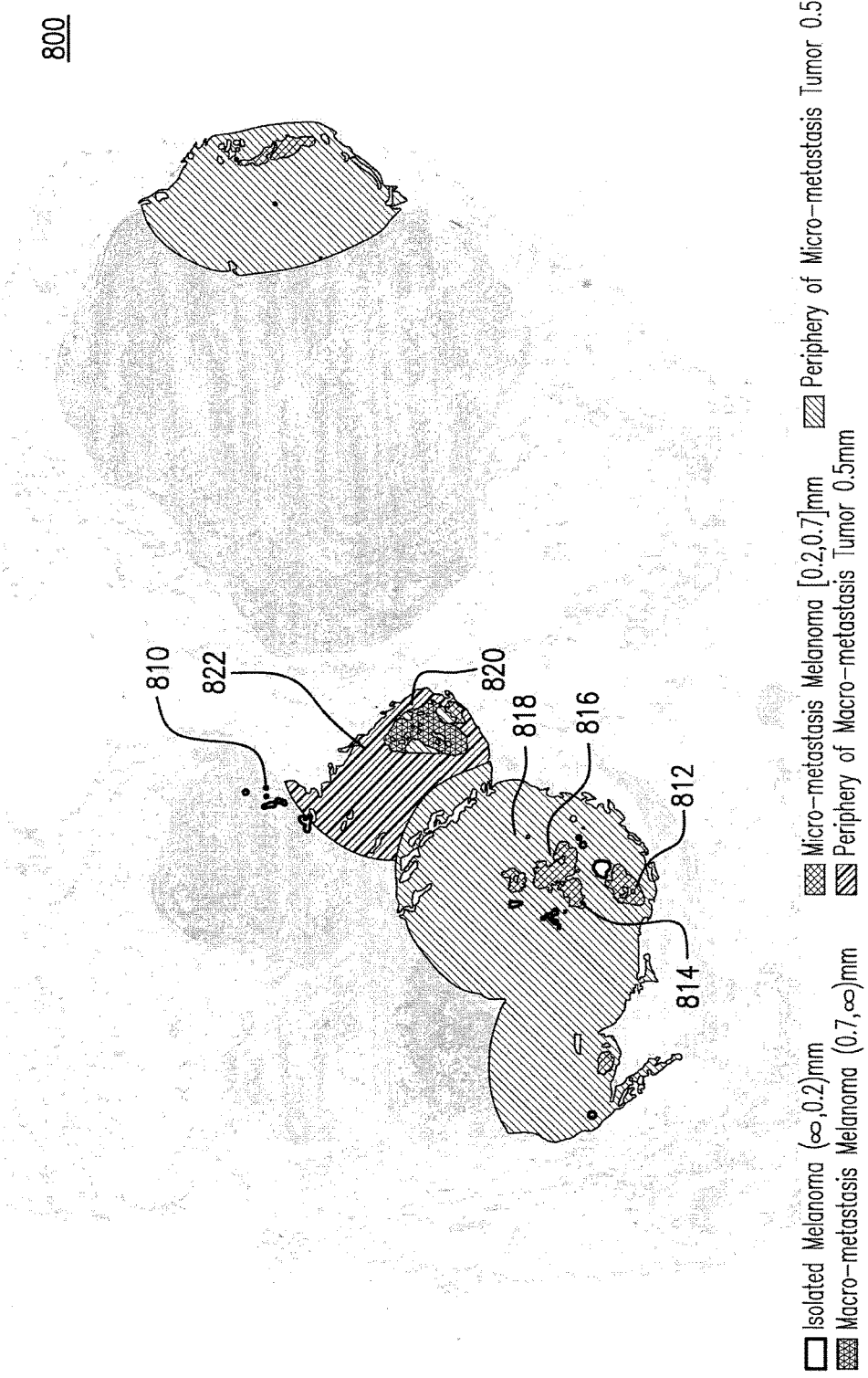
FIG. 8 illustrates an example of tumor region labeling in a whole slide image, in accordance with embodiments of the present invention.
Figure 9:
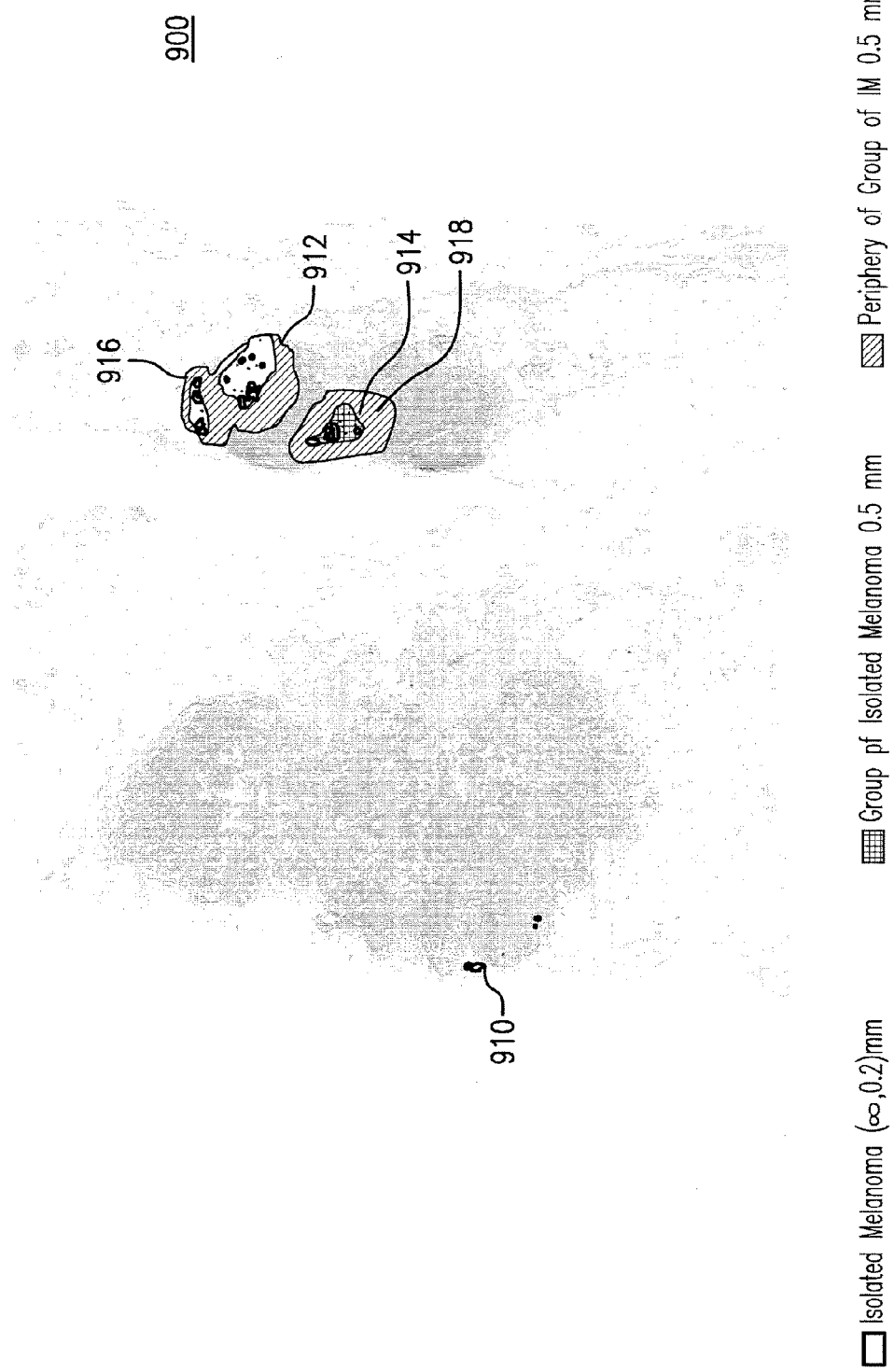
FIG. 9 illustrates an example of tumor region labeling in a whole slide image, in accordance with embodiments of the present invention.

An example of a region labeling result for melanoma is shown in FIG. 4, FIG. 8 and FIG. 9. As shown in FIG. 8, the regions of Isolated Melanoma 810, Micro-metastasis 812, 814, 816, Periphery of Micro-metastasis 818, Macro-metastasis 820, and Periphery of Macro-metastasis 822 are identified. In FIG. 9, the regions of Isolated Melanoma 910, Group of Isolated Melanoma 912, 914, 916 and Periphery of Group of Isolated Melanoma 918 are identified.

Figure 3:
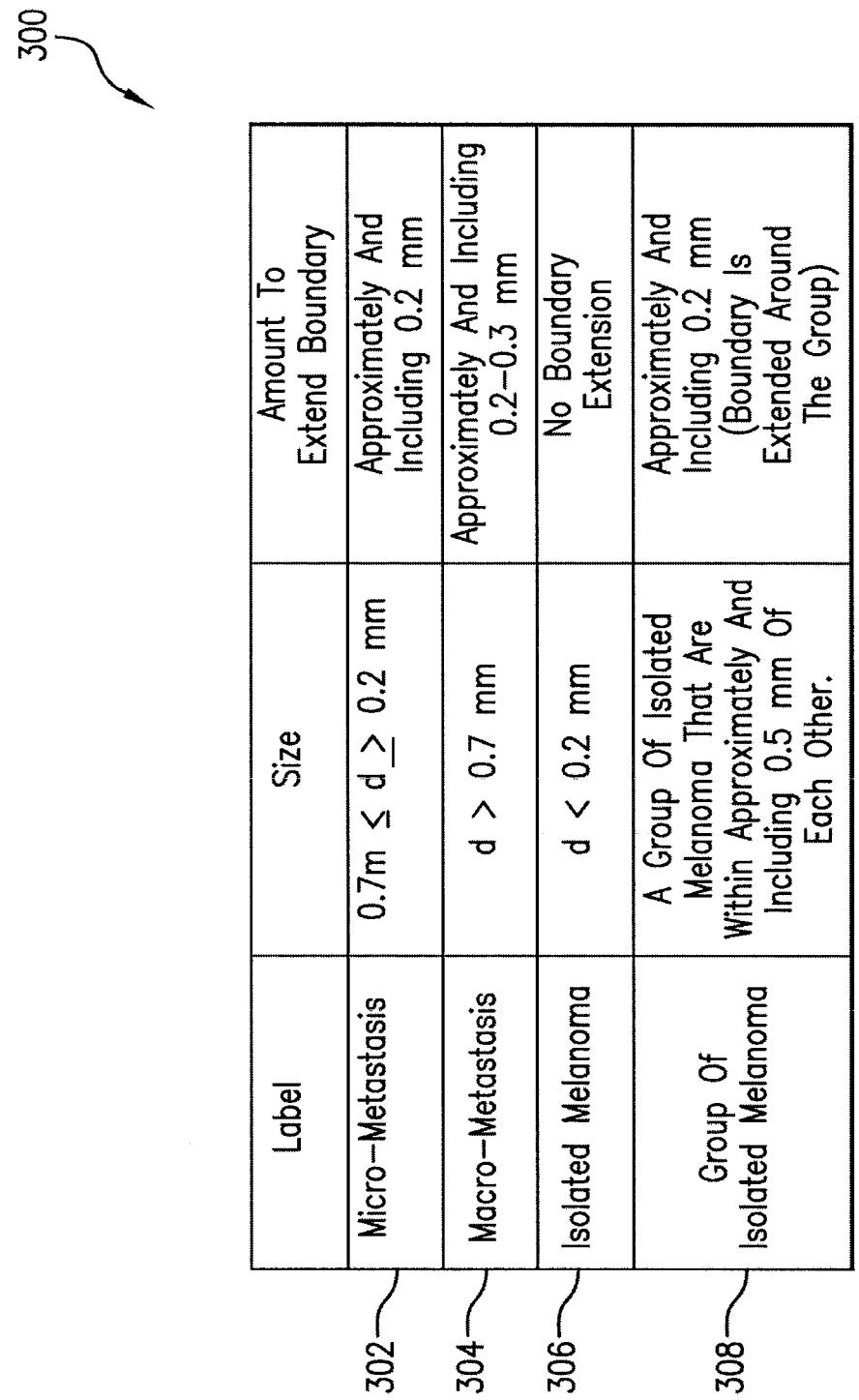
FIG. 3 illustrates a reference chart in accordance with embodiments of present invention.

In step 212, an extended region or extended region data is generated for the identified and/or annotated intra-tumor regions of the tumor image. For example, the annotated melanoma tumor region in the image is extended and referred to herein as the extended region. In embodiments of the invention, data is stored, for example, in the reference database 116, that correlates, for example, a tumor size and/or a labeled tumor region to an amount that the tumor region boundary should be extended. For example, as shown in FIG. 3, data 300 is stored in a database, such as in a look-up table format, that correlates a melanoma tumor region size to an amount that the tumor region boundary should be extended. For example, in row 302, (1) if the diameter d across the identified tumor region (i.e., the longest distance or length through the center of the annotated region or tumor) 402, as shown in FIG. 4, is greater than or equal to 0.2 mm and less than or equal to 0.7 mm and/or (2) the region (e.g., annotated tumor region) is labeled micro-metastasis, then an extended boundary region 404 and/or data is generated for the tumor region that corresponds to approximately 0.2 mm distance away from the originally annotated tumor region. While the table in FIG. 3, describes a range, a user of embodiments of the present invention, assigns and associates a specific boundary extension amount from the available range, to a particular tumor sizes and/or labels. In embodiments of the present invention, the extended boundary distance is generated such that the extended boundary distance is a perpendicular distance (for example, calculated by computing a Euclidean distance) amount away from each point or a set of given locations around the annotated tumor region. As such, the extended boundary region should be similar in appearance to the annotated tumor region.

As shown in row 304, if the diameter 406 of the region (e.g., melanoma tumor region) is greater than 0.7 mm and/or labeled macro-metastasis 430, then the extended boundary region 408, which is generated, is a user selected amount of approximately, between and including, 0.2-0.3 mm. As shown in row 306, if the diameter of the identified region or tumor (e.g., melanoma tumor region) is less than 0.2 mm and/or labeled isolated melanoma 410, then an extended boundary region is not generated. As shown in row 308, if a group of isolated melanoma (i.e., a group of isolated melanoma that are within approximately 0.5 mm of each other) 412 is identified, then an extended boundary region 414 of about 0.2 mm is generated around or for the group of isolated melanoma.

In step 214, a determination is made as to whether a single multiplex image was received from which a plurality of marker images and the tumor image was derived or whether a plurality of marker images was received which were taken from different slides.

If the image analysis system determines that a single multiplex image was received from which both the marker images and the tumor images were derived (via spectral unmixing), in step 216 the FOVs are automatically determined in each of said marker images. In this case, an image registration algorithm for mapping the marker images and the tumor image to a common coordinate system does not have to be performed as said images already stem from a common slide and coordinate system.

If a plurality of marker images is received in the form of a plurality of images respectively been taken from different tissue slides, the tissue slides comprising adjacent tissue sections and having been stained with selective dyes for the different immune cell markers, an image registration step is performed for aligning the multiple marker images and the tumor image received in step 204 to a common coordinate system. In a subsequent step, FOVs are identified in each of the marker images.

In both cases, according to embodiments of the invention, the automated identification of the FOVs in each of the marker images may comprise or may be performed via methods disclosed in PCT/EP2015/062015, entitled AUTOMATIC FIELD OF VIEW SELECTION SYSTEMS AND METHODS. The automatic FOV detection and/or selection methods, in accordance with PCT/EP2015/062015, include, for example (see FIG. 6), computing a tissue region mask 612 from e.g. a low resolution input image, applying a low pass filter on the marker image for computing a low pass filtered image 634 of each marker image, generating a tissue region mask 633 from the input image, and multiplying the tissue region mask 633 with the low pass filtered image 634 for computing a masked filtered image. The masked filtered image is used for identifying a plurality of candidate fields of view (FOVs) within the masked filtered image or a derivative thereof, e.g. a heat map 635 of the immune cell marker computed from the masked filtered image. In embodiments of the present invention, the FOVs are generated in any one of the intra-tumor region and/or in the extended regions.

In some embodiments, a heat map 608 may be computed from the masked filtered image. In some embodiments, the heat map generation comprises applying colors to the masked filtered image, wherein low intensity regions are assigned to blue colors and higher intensity regions are assigned to yellow orange and red colors. Any other appropriate colors or combinations of colors may be used to assign low and high intensity regions.

Figure 7:
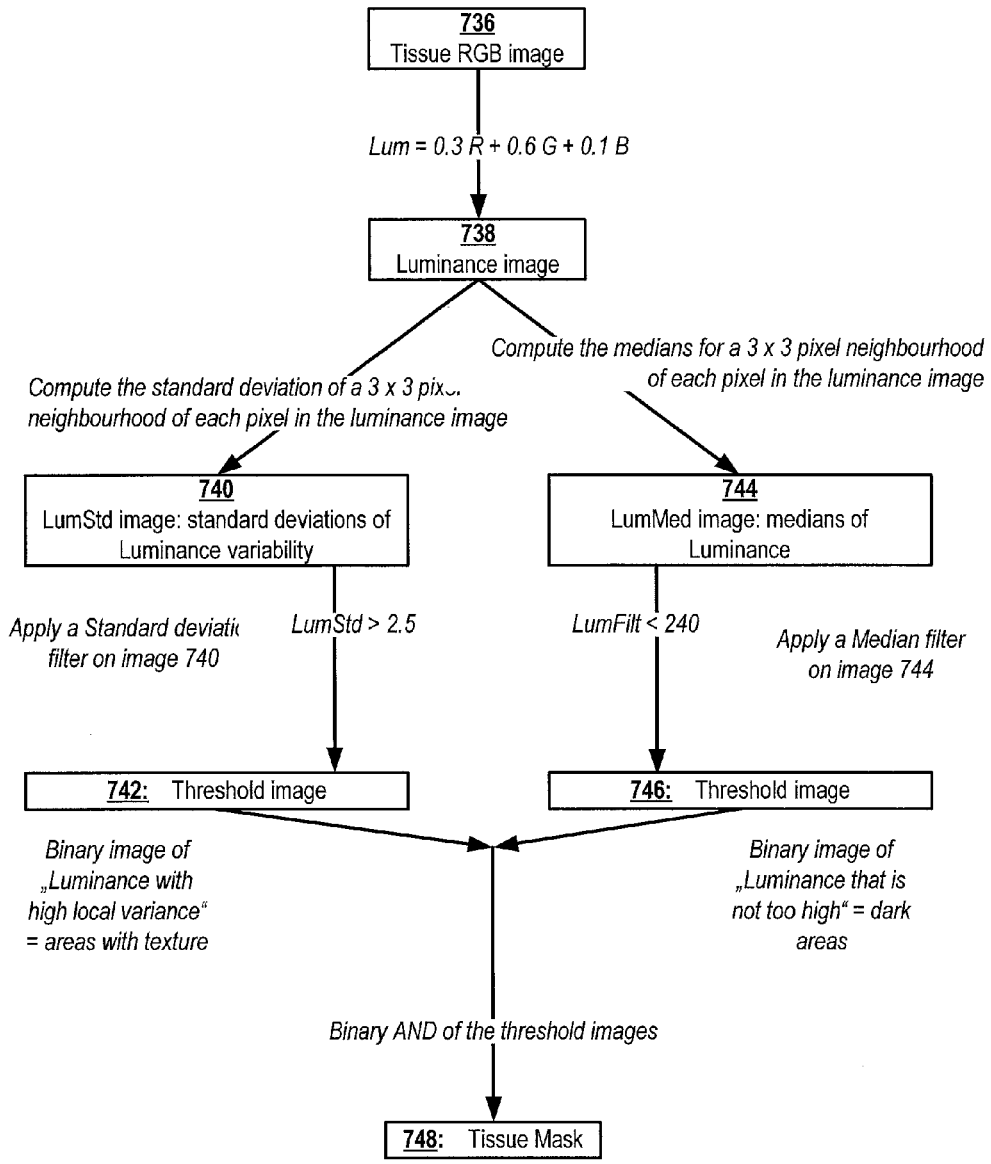
FIG. 7 illustrates generating a tissue mask image in accordance with embodiments of the present invention.

In some embodiments, the generation of the tissue region mask comprises one or more of the following operations (but not limited to the following operations) depicted in FIG. 7: computing the luminance (737) of an input image 736 from which the tumor image and/or one of the marker images is derived. The input image may be a low resolution input image; producing a luminance image 738 from the RGB values of the pixels of the input image; computing the luminance variance image 740 for a plurality of sub-regions within the luminance image; applying a variability-based threshold filter (e.g. a standard deviation filter) to the pixels of the luminance image 739 for producing a filtered luminance image (742), also referred to as "threshold image" of the luminance variability. For example, each pixel in the image 740 may respectively have assigned a value indicating luminance variability in the neighborhoods of the pixel. For example, the value indicating luminance variability in the neighborhood of a pixel may e.g. be a standard deviation of the pixel luminance values calculated for a 3×3 pixel matrix comprising said pixel in its center. The application of the threshold filter on image 740 may comprise setting pixels with a luminance above a given threshold, e.g. 2.5 standard deviations, to one, and pixels below the threshold to zero, thereby producing a threshold image 742. According to embodiments, this threshold image 742 is directly used as a tissue mask (or "tissue region mask") for masking all pixels not lying within a tissue area. Image areas with a high local luminance variance indicate areas with textures and thus indicate that a respective area of a slide relates to a tissue area.

According to some embodiments, in addition to the images 740 and 742, a luminance medians image 744 is computed from the luminance image 738. For example, a median luminance value is computed for each pixel of the luminance image by identifying a 3×3 pixel matrix comprising said pixel in its center, determining the luminance values of each of said 3×3 pixels, determining the median of said 3×3 luminance values and assigning the median luminance value to the pixel in the center of the 3×3 pixel matrix. Then, a threshold filter is applied on image 744 by setting pixels with a luminance median below a given threshold, e.g. 240, to one, and pixels above the threshold to zero, thereby producing a threshold image 746. Thus, the threshold image 746 is indicative of pixel areas whose luminance is not too high and may be used for filtering out staining artifacts.

According to embodiments, this threshold image 746 is combined with the threshold image 742 for computing the tissue mask 748. For example, each pixel in the tissue mask 748 will comprise "1" in case both respective pixels in the two threshold images 742, 746 comprise "1", otherwise the pixel in the tissue mask 748 is set to "0". In embodiments of the invention, the image 742 or the image 748 is used as the tissue mask 633 of FIG. 6.

In some embodiments, the tissue region mask is computed directly from the high resolution input image. In this case, the tissue region mask may be converted to a lower resolution image before application to the filtered marker images. In embodiments of the present invention, when there is more than one input image (e.g., an H&E image and an IHC image or a set of images of tissue samples from a same block of tissue), the automatic FOV detection and/or selection methods, in accordance with PCT/EP2015/062015, include, for example, computing a tissue region mask (633) from the low resolution input image, computing a low pass filtered image 634 of each marker image, generating a masked filtered image for each marker image, where the masked filtered image is the tissue region mask 633 multiplied by the low pass filtered image, identifying a plurality of candidate fields of view (FOVs) within each masked filtered image, when there is more than one input image, merging a subset of a plurality of candidate FOVs for each image marker image, into a plurality of merged FOVs, and depicting the merged portion of the plurality of candidate fields of view on the input image. In embodiments of the present invention, the FOVs generated for the one or more regions of interest (e.g., tumor region) 416 and/or in the expanded region 418. However, other methods of identification of FOVs may be utilized.

Figure 6:
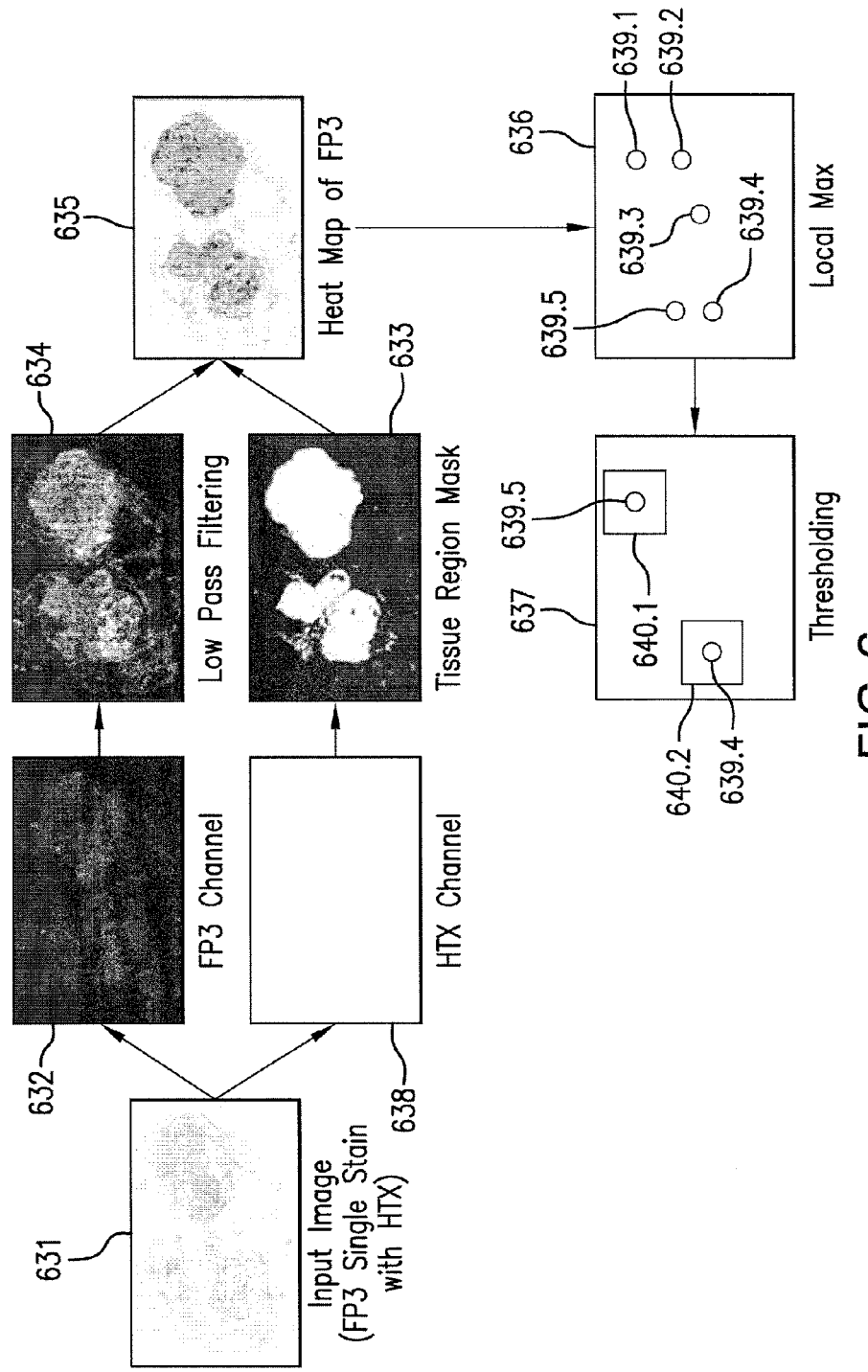
FIG. 6 illustrates automatically generating FOVs in accordance with embodiments of the present invention.

If a set of images constitutes the input, then a determination is made, in step 218 as to whether the set of images are from a single multiplex image. If yes, then, in step 220, FOVs are identified in each image and registered in a single one of the images. If no, then in step 222 FOVs are identified in each image of the set of images, and the identified FOVs are registered in a same coordinate system. In embodiments of the present invention, images are registered in steps 220 and 222, in accordance, for example, with methods disclosed in PCT application, PCT/EP2014/05478 entitled WHOLE SLIDE IMAGE REGISTRATION AND CROSS-IMAGE ANNOTATION DEVICES, SYSTEMS AND METHODS. However, other methods of registration may be utilized. In embodiments of the present invention, in step 224, FOVs are selected for determining a cell count in the FOVs. In embodiments of the present invention, FOVs are selected in accordance with methods disclosed in PCT/EP2015/062015. The low pass filtered image 634 with or without the added heat map 635 is then local maximum filtered which provides the local max filtered image 636. The local max filtered image 636 comprises a number of local maxima 639, in the example considered here five local maxima 539.1-539.5 as depicted in FIG. 6. Next, a thresholding operation is performed on the local max filtered image 636 such as by applying a threshold onto the local max filtered image 636 such that only the local maxima 639.1 and 639.4 that surpass this threshold are not removed by the thresholding operation. Alternatively, the local maxima 639 are ranked in a sorted list and only a number of the K topmost local maxima are taken from the list, where K is 2 for explanatory purposes in the embodiment considered here, resulting in the local maxima 639.1 and 639.4. Each of the local maxima 639 consists of a set of neighboring pixels. This thresholding operation provides the thresholded image 637. Each of the local maxima 639.1 and 639.4 in the thresholded image 637 may define the location of a respective field of view 640.1 and 640.2, respectively. Depending on the implementation, these fields of view 640.1 and 640.2 may be candidate fields of view for testing whether these fields of view can be merged with other fields of view in subsequent processing operations. The positions of the fields of view 640.1 and 640.2 are defined by means of the thresholded image 637 and its local maxima. After locating the local maximum coordinates in different marker images which can be from the unmixing of a multiplex slide or may be from single stain slides, the FOVs are obtained around the local maximums. However, the content of the fields of view is taken from the respective image area within the original multi-channel image 631 in order to take advantage of the full pictorial information content for performing an image analysis of the respective field of view. In embodiments of the present invention, the FOVs are generated within the intra-tumor region(s) 416 and/or in the expanded region(s) 418.

In embodiments of the present invention, to integrate the FOVs so that for each patient case, a same set of FOVs is created across different markers, there are many possible options. For example, the marker images may be integrated into a single coordinate system via, for example, the method shown in shown in FIG. 10, and involves having different FOVs for different marker images 1004, 1006, 1008, and analyzing those FOVs independently. The final FOVs 1020 are the union of all the FOVs from each marker. Said final FOVS are mapped back to the coordinate system of the individual marker images and will overlap but not be identical to the original FOVs. In some embodiments, the final FOVs (and not the original FOVS identified in the respective marker images) are used for counting the immune cells in the individual marker images. This may have the advantage that in all marker images, the same areas (the final FOVS resulting from a merging or intersection of the original (or "candidate") FOVS) are evaluated for determining the immune cell count. This may increase accuracy and reproducibility of the score calculation and may ease the calculation of relative amounts of immune cell types in a given area. Another possible method for integrating or merging FOVs into a single coordinate system involves specifying the most important marker images for a given problem, and merging the FOVs based on the selected markers. For example, assume PF3 and CD8 are the most important markers in a study of melanoma. The method of merging FOVs, in accordance with the present invention, for unmixed images from a multiplex slide, does not require registration. Morphological operations such as union and intersection, may directly be applied to the candidate FOVs, to obtain the merged FOVs. The immune cell counting may be performed in the merged FOVs in each of the marker images rather than in the original ("candidate") FOVs of the marker image as described in the paragraph above. For scanned images from a serial section of slides, the registration step is applied after obtaining region labels. All the images of single markers are aligned to a reference image and then may be transferred into a same coordinate system. The reference coordinate system can be a slide section in the middle of the tissue block or the slide with a specific marker.

In step 226, cells are counted in the FOVs. In embodiments of the present invention the cells are detected and counted via, for example, via methods disclosed in PCT application PCT/EP2015/061226, entitled Deep Learning Based Automatic Cell Counting System and Method and PCT application and PCT application PCT/EP2015/053643, entitled Methods, Kits, and Systems for Scoring the Immune Response to Cancer.

Figure 11:
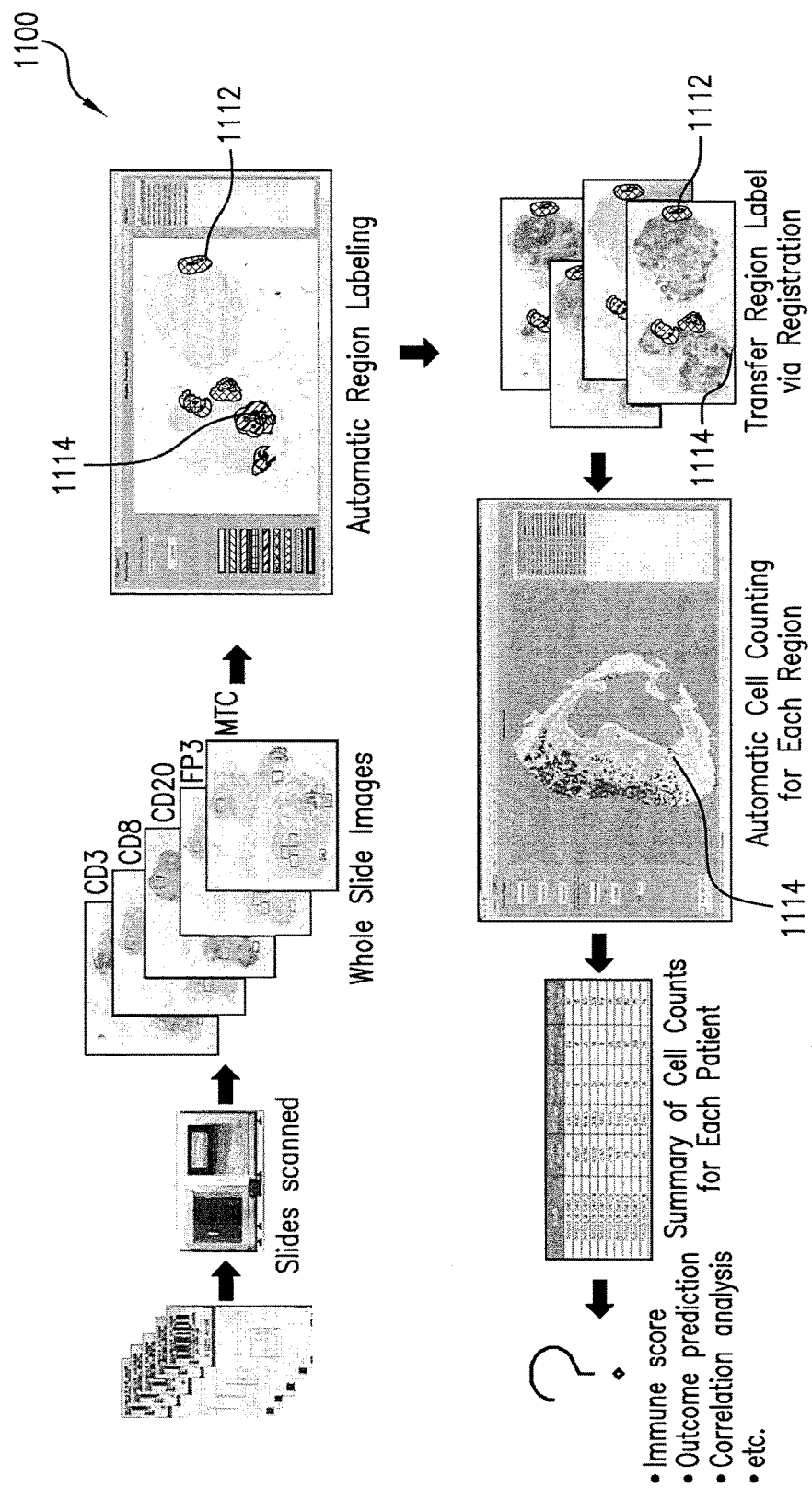
FIG. 11 illustrates an example workflow of computing cell counts within respective regions in accordance with embodiments of the present invention.

In embodiments of the present invention, alternatively, the FOV selection step comprises using each of the whole regions 1112, 1114 as a single FOV and computing the cell counts within each entire region 1112, 1114 used as respective FOV. FIG. 11 shows an example workflow and associated user interface, for computing the cell counts within each entire region 1112,1114 without FOV selection. As shown in FIG. 11, each entire region 1112, 1114 is considered a single FOV and all the cells within each region 1114 are detected and counted.

In embodiments of the present invention, in step 228, an immune score and/or an immune related score is computed based on the cells counted in the selected FOVs.

In embodiments of the present invention, the one or more cell counts (e.g., immune-related cells and/or lymphocytes) and/or scores are output to a display.

Figure 12:
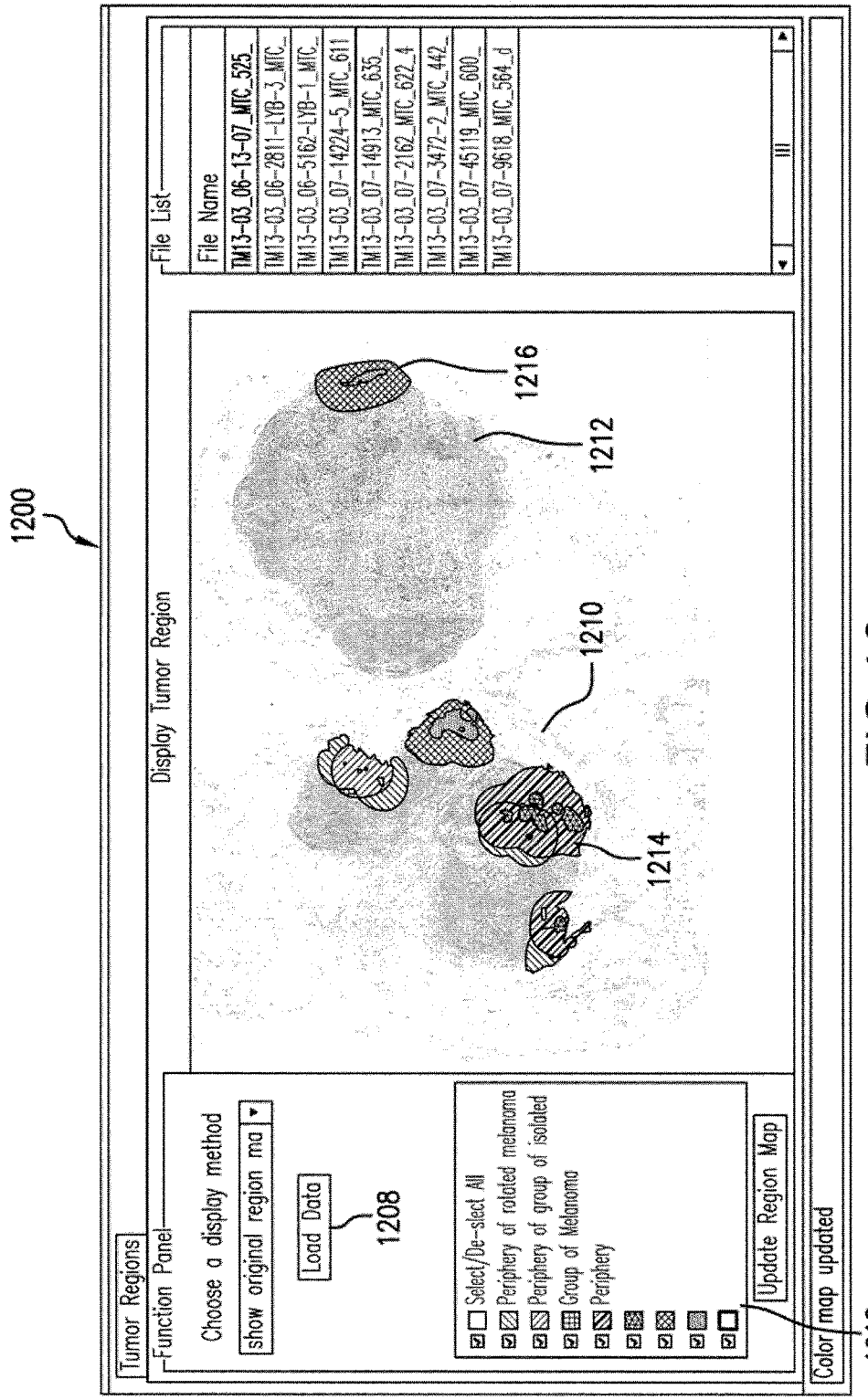
FIG. 12 illustrates an example GUI illustrating the tumor based region labeling, in accordance with embodiments of the present invention.

In embodiments of the present invention, as shown in FIG. 12, a user interface allows users to load 1208 one or more images 1210, 1212, visualize region maps and/or heat maps 1214, 1216, select different combinations of tumor regions to display 1218, select a number of FOVs, and/or save the FOVs, and generate reports.

Figure 15:
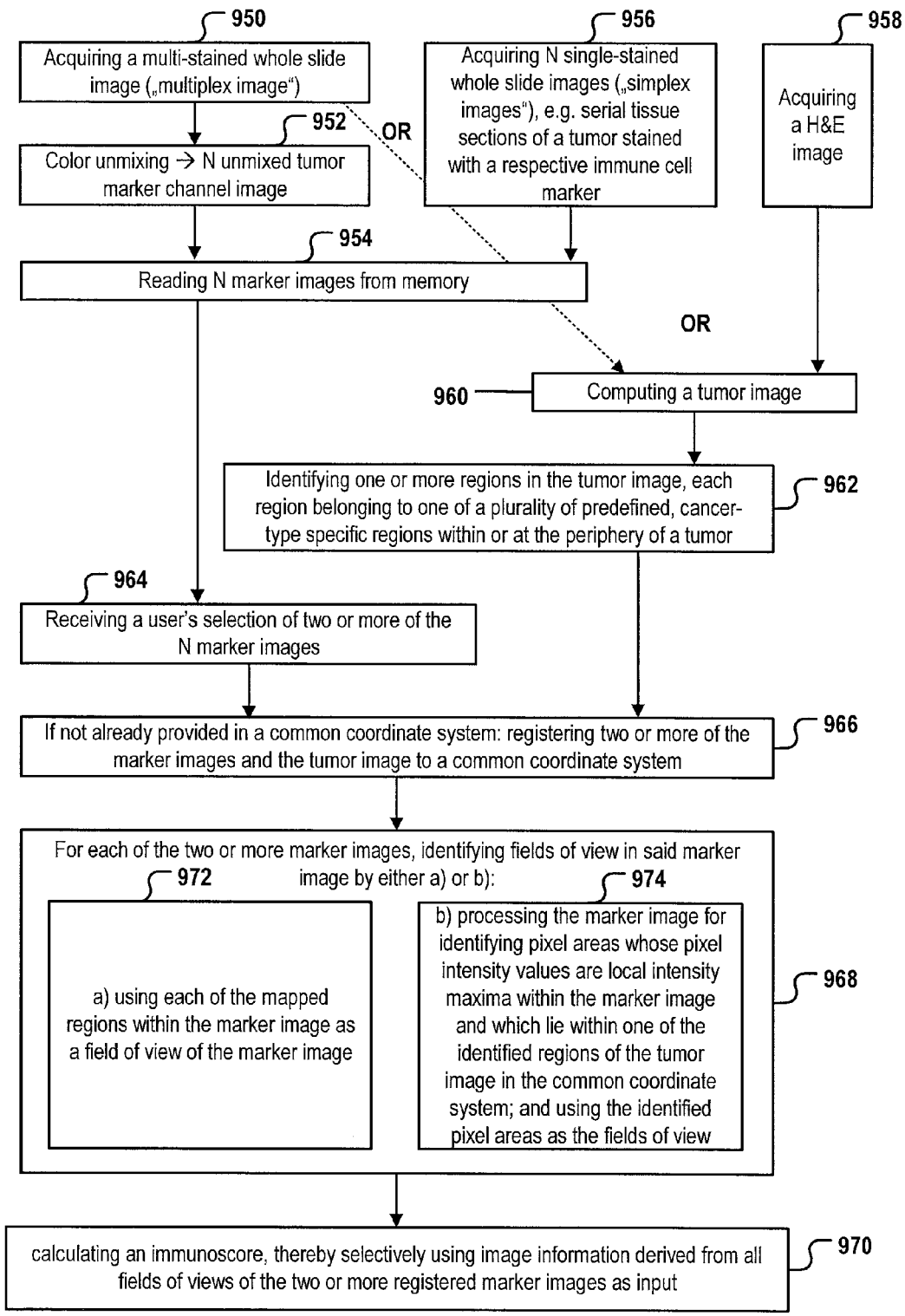
FIG. 15 illustrates a method of computing an immune score according to embodiments of the invention.

In the following, an embodiment of an image analysis system according to embodiments of the invention is described by making reference to FIG. 5. An image analysis system 500 for automatic immune score computation comprises a processor 505 and memory 510, e.g. a random access memory RAM. The memory comprises interpretable instructions which, when executed by the processor, cause the processor to perform a method described herein for embodiments of the invention. In the following, the function of the image analysis system according to embodiments of the invention will be described by making reference to FIG. 15.

Figure 14:
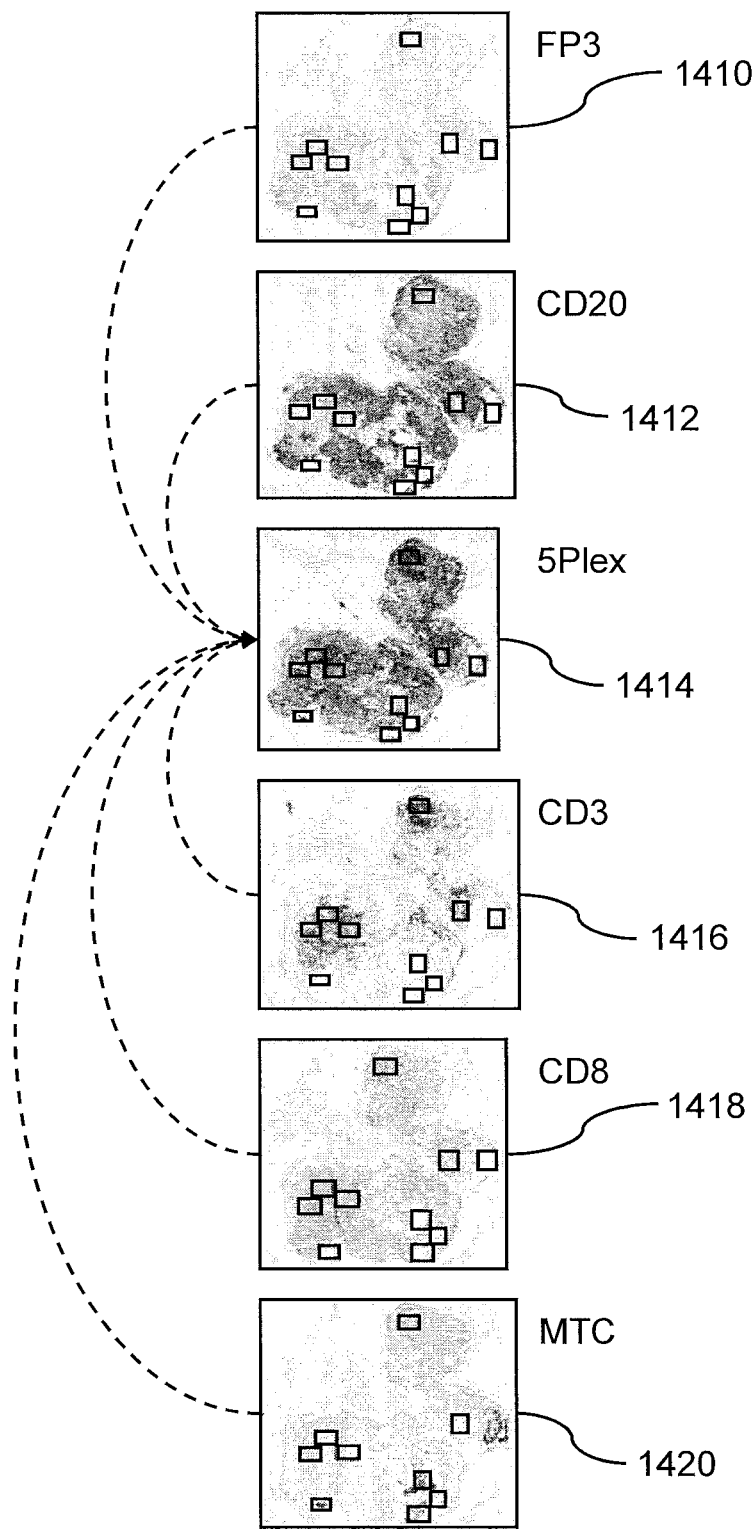
FIG. 14 illustrates an example of using the 5plex slide as the reference coordinate system and aligning other slides to it, in accordance with embodiments of the present invention.

In a first step 945, the processor 505 reads multiple marker images 631 from memory 510. The marker images may have been stored to memory by means of an image acquisition and storage system 502, e.g. a slide scanning device depicted in FIG. 11. The pixel intensities of each marker image corresponds to the amount of a respective immune cell marker on a slide used for generating said marker image. Each of the multiple marker images corresponds to a different immune cell marker, e.g. CD3, CD20, FP3 and CD8 as depicted in FIGS. 13 and 14.

In a further step 960, the processor 505 computes a tumor image. The tumor image selectively indicates tumor cells of a particular cancer type, e.g. melanoma cells. The melanoma cells are typically located in the tumor image in the form of a plurality of tumor cell clusters of different sizes and shapes. FIG. 4 depicts various examples of tumor cell clusters ("tumors"). The input image from which the tumor image is derived can be, for example, an image of an H&E stained tissue slide being stained in addition by a stain that selectively binds to a tumor-specific marker. The tumor image can be derived, for example, from a digital image of a tissue section slide having been stained by a tumor specific stain and/or by an H&E staining approach. The input image depicts the same tissue section as the tissue section depicted by each of the multiple marker images (in the multiplexed scenario) are depicts a tissue section adjacent to one of the tissue sections depicted by each of the multiple marker images (in the simplex scenario). In the simplex scenario, the tumor image is preferentially derived from a tissue section in the middle of the plurality of adjacent tissue sections from which the individual marker images were derived. This may increase the accuracy of immune score computation, because the individual marker images and the one tumor image can be unified into one common coordinate system more accurately.

In a further step 962, the processor identifies one or more intra- or peri-tumor regions in the tumor image. The regions are depicted, for example, in FIG. 4 in the form of a schematic drawing and in FIGS. 8 and 9 in the form of an annotated and highlighted digital marker image. Each identified region belongs to one of a plurality of predefined, cancer-type specific regions within or at the periphery of a tumor (see FIG. 3). For example, the processor may at first identify two more intra-tumor regions of various sizes, e.g. by means of an intensity threshold-based approach and by applying some cancer-type specific rules for classifying the intra-tumor regions into intra-tumor region types typical for a particular type of cancer. In a subsequent step, the processor may apply additional cancer-type specific rules for identifying further regions in the periphery of the two more intra-tumor regions identified in the previous step. A peri-tumor region can be identified by extending the border of an intra-tumor region by a predefined distance which depends on the type of the extended intra-tumor region and on the cancer type. Some types of tumor regions 410 may lack a periphery region.

In step 964, the processor may receive a user's selection of two or more of the marker images. For example, the user may select different combinations of the two or more marker images. In addition, or alternatively, the user may select different combinations of tumor region types to be displayed. For example, such a selection can be implemented by means of a graphical user interface depicted in FIG. 12. If not already provided in a common coordinate system, the image analysis system registers the two or more selected marker images and the tumor image to a common coordinate system in step 966. The step 966 may be performed before step 964 is executed, e.g. by registering all available marker images and the tumor image in a common coordinate system.

In a further step 968, the processor 505 identifies multiple fields of view (FOVs) in each of the marker images by applying either a sub-method 972 or sub-method 974.

In case of executing sub-method 972, the processor maps the identified intra- and peri-tumor regions to each of the two or more marker images in the common coordinate system and uses each mapped region as a respective FOV of said marker image. Thus, in case 20 intra- and peri-tumor regions were identified in the tumor image, up to 20 FOVs are determined in each of the marker image.

In case of executing sub-method 974, the processor also maps the identified intra- and peri-tumor regions to each of the two or more marker images in a common coordinate system. In addition, the processor analyzes each of the marker images for identifying, within each of the marker images, one or more pixel areas whose pixel intensity values constitute local intensity maxima within said analyzed marker image. In addition, the processor checks if the identified local intensity maxima lie within one of the mapped tumor regions having been mapped from the tumor image to that marker image. If both conditions are fulfilled, the identified pixel areas are used as the FOVs of that marker image. According to some embodiments, the processor identifies, for each of the marker images and for each of the mapped intra- and peri-tumor regions, a number K of the fields of view having the highest intensity values and lying within the mapped region. Thus, in case 20 tumor regions were mapped ("aligned") to a particular marker image and in case in each of that mapped regions 3 FOVs with the highest intensity values are to be identified, said particular marker image comprises up to 60 identified FOVs.

According to embodiments, each identified intra- or peri-tumor region has assigned an annotation or label being indicative of the type of said region. The processor may assign to each of the FOVs identified in method 972 or 974 a label being indicative of the tumor region type comprising the FOV.

In step 970, the processor calculates an immune score. Thereby, the processor selectively uses image information derived from all the FOVs of the two or more registered marker images as input.

For example, according to some embodiments, the number of immune cells of a first type, e.g. T cells, may be counted by applying a cell detection and counting algorithm selectively on the FOVs of a first one of the marker images whose marker is selectively expressed in the first type of immune cells. In addition, the cell density of the first type of immune cells within the respective tumor regions is identified by evaluating the pixel intensity values of the respective tumor regions in the first marker image. In addition, the number of immune cells of a second type, e.g. B cells, may be counted by applying the cell detection and counting algorithm selectively on the FOVs of a second one of the marker images whose marker is selectively expressed in the second type of immune cells. In addition, the cell density of the first type of immune cells within the respective tumor regions is identified by evaluating pixel intensity values of the respective tumor regions in the second marker image. The cell counts and cell densities and optionally further features such as said cluster structure and size or the total number of cells in a FOV (including non-immune cells, e.g. tumor cells) may be used as input to a cancer-type specific immune score calculation logic which computes an immune score that is highly accurate and reproducible.

In a further aspect, embodiments of the invention relate to a computer-implemented method and system for tumor region based immune score computation workflow. The tumor region based immune score computation workflow involves identifying multiple intra- and peri-tumor regions, partitioning the whole slide image into the multiple intra- and peri-tumor regions, selecting FOVs based on the density of each immune cell marker of one of the marker images within each region and finally computing the number of cells for each FOV. As a result, a digital method for immune score computation, in accordance with the present invention, is provided that automatically takes one or more whole slide images (or portion of one or more whole slide images), as input, and generates a cell count or cell counts for computer selected FOVs that may be further analyzed by a pathologist or other evaluator to correlate the counts with immune scores.

For example, a range can be set by the pathologist to relate the cell counts that are below 100 to an immune score of 1, above 100 and below 200 to an immune score of 2 and above 200 to immune score of 3.

Embodiments of the present invention involve providing an automated complete workflow for immune score computation in an image of a slide (containing a biological specimen, such as a tissue sample) that has been stained with one or more stains (for example, fluorophores, quantum dots, reagents, tyramides, DAPI, etc.).

Figure 5:
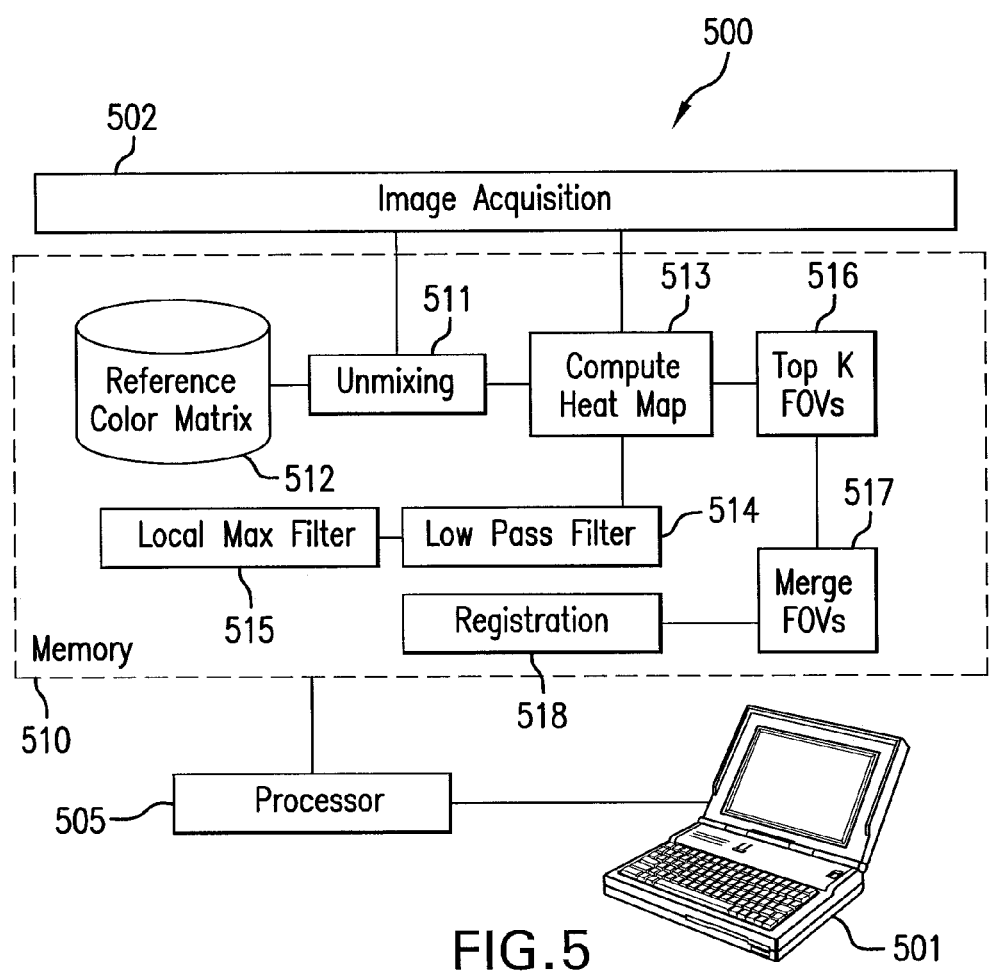
FIG. 5 illustrates an automatic FOV identification system in accordance with embodiments of the present invention.

According to embodiments, the image acquisition means 502 of FIG. 5 is a detector system (for example, CCD detection system), scanner or camera (for example a spectral camera). In an exemplary embodiment of the present invention, a scanner that scans the biological specimen (which may be placed on a substrate such as a slide), and the image is saved in a memory of the system as a digitized image. If the image saved is a multiplex image, unmixing is performed to unmix the multiplex image into individual marker color channels. The unmixing module 104 will read from a reference color matrix database 512 to obtain the reference color matrix for the stains or corresponding to the different biomarkers, and use the reference color matrix to unmix the multiplex image.

If the image is of a multiplex slide, color unmixing is performed, for example according to the unmixing method disclosed in international patent application WO 2014/195193 filed on May 28, 2014 (claiming priority of Patent Application 61/830,620, filed Jun. 3, 2013), entitled "Image Adaptive Physiologically Plausible Color Separation", and that is hereby incorporated by reference in its entirety.

The method disclosed in international Patent Application PCT/EP2015/053745 filed on Feb. 23, 2015 (claiming priority of Patent Application 61/943,265, filed Feb. 21, 2014), and entitled. "Group Sparsity Model for Image Unmixing", which is hereby incorporated by reference in its entirety, may also be utilized for performing the unmixing, in an exemplary embodiment of the present invention, to obtain an image or image data for each marker.

If the image is of a single stain slide, the scanned image of the single stain slide of each marker is directly utilized in the workflow.

According to embodiments, a tumor mask is computed from an input image. The input image may be, for example, the unmixed tumor marker channel of a multiplex image, a single stain slide with tumor staining, and/or an H&E slide by a tumor segmentation algorithm in accordance with the present invention. The algorithm can be a thresholding based method for single channel tumor marker image or learning based method, for example when the image is an H&E image. The tumor mask may be computed, for example, by a tumor mask computation module. For example, the tumor mask may be applied on the input image for generating the tumor image that selectively depicts tumor cells of a particular cancer type, e.g. melanoma cells.

A region map of the whole slide image (or portion thereof) is created by incorporating the tumor clusters' location and/or size information in the tumor image. For example, micro-metastasis regions and macro-metastasis regions are defined based on the size of the tumor and periphery regions are defined based on their distances to the tumor locations. The information may be incorporated in the form of labels included in the tumor image by a region labeling unit.

For a serial section of slides, an inter-marker image registration algorithm is used, e.g. by a registration unit 518, to map the labeled regions of the tumor image to each of the IHC slides from serial sections of IHC slides with different markers. Each of the IHC slides may correspond to a marker image. The registration unit may map the labeled regions to the respective marker images via a common coordinate system. Registration is not required for the unmixed images of the multiplexed slide since all the markers are in the same coordinate system.

A heat map is generated, e.g. by a heat map computation unit 513, for each individual marker image by assigning colors to a low pass filtered marker image. The heat map illustrates pixels according to the respective pixel intensities. The pixel intensities reflect the densities of the biomarker in the slide, and thus, correspond to the density of the immune cell distribution in each marker image or tumor region mapped to said marker image. For example, the heat map will distinguish high intensity pixels (representing high densities of the respective marker and thus high densities of an immune cell of a particular type) from low intensity pixels (representing low densities of the respective marker) by illustrating higher intensity pixels in a color that is different, e.g. warmer, than a color used for lower intensity pixels.

FIG. 6 shows an example heat map computation process. A low pass filter module 514 may apply a low pass filter on each of the marker images for obtaining a respective low pass filtered image. A local max filter is applied to the low pass filtered image to obtain the local maxima of the low pass filtered image. The method disclosed in international Patent Application PCT/EP2015/062015 filed on May 29, 2015 and entitled "An image processing method and system for analyzing a multi-channel image obtained from a biological tissue sample being stained by multiple stains" (claiming priority of Patent Application 62/005,222 filed May 30, 2014, and entitled "Systems and Methods for Automatic Field of View Selection in Immune score Computation"), which is hereby incorporated by reference in its entirety, is utilized for generating the heat map, in an exemplary embodiment, to obtain candidate FOVs within each defined intra- or peri-tumor region. It should be appreciated by one of ordinary skill in the art that other methods for generating a heat map may be utilized.

The top K regions (where K is a predetermined parameter selected by a user, for example, K can be chosen from 5, 10, 15 or 20) with the highest densities are selected from the local max filtered image within each labeled intra- and inter tumor region as the candidate FOVs for each image. When the immune response is high, the cells are clustered together resulting in regions having high pixel intensities indicating a high density of the marker, while when the immune response is low, the cells are more scattered. As a result, the pixel intensities in the regions mapped to a respective marker image (and the heat map derived therefrom) is low, thus indicating a low marker density in the respective region. As a final step, an automatic cell counting algorithm, in accordance with the present invention, is applied to each FOV and reports the number of cells of each immune cell type.

Shown in FIG. 3 are region definitions, in accordance with embodiments of the present invention. FIG. 4 depicts a tumor image wherein multiple intra- and peri-tumor regions, also referred to as "regions" have been automatically identified and annotated accordingly. As shown in FIG. 3 and FIG. 4, the following regions are defined:

a. Micro-metastasis: a region with a diameter greater than 0.2 mm and less than 0.7 mm
b. Periphery of Micro-metastasis 204: the region in the 0.2 mm neighborhood (the area surrounding a given region) of a
c. Macro-metastasis: with diameter greater than 0.7 mm
d. Periphery of Macro-metastasis: the region in the 0.2 mm neighborhood (the area surrounding a given region) of c
e. Isolated melanoma: with diameter less than 0.2 mm
f. Group of Isolated melanoma: a group of e that are within 5 mm to each other
g. Periphery of group of isolated melanoma: the region in the 0.2 mm neighborhood (the area surrounding a given region) of item f above.

The type of regions and the parameters associated with the region definitions can be determined by a pathologists empirically for a particular cancer type, e.g. based on a melanoma data set of the current application. While 1 mm for the periphery of tumor (i.e., extended region size) may be suitable for colorectal cancer, it cannot be applied to other tumors, for example, to lymph node metastases (e.g., that is associated with melanoma, because of the nature of this particular type of disease. However, the regions and parameters are subject to change for different applications and/or cancer types.

An example of a region labeling result for melanoma is shown in FIGS. 4, 8 and 9. The regions of Isolated Melanoma, Micro-metastasis, Periphery of Micro-metastasis, Macro-metastasis, Periphery of Macro-metastasis, Group of Isolated Melanoma and/or and Periphery of Group of Isolated Melanoma are identified.

FIG. 6 depicts the creation of a heat map 635 of a marker image corresponding to the marker FP3 from an input image 631, e.g. a digital image derived from a single stained tissue slide in which the marker FP3 was stained by a respective marker-specific single stain in combination with hematoxylin (HTX). The HTX is an unspecific stain capable of staining any kind of tissue or cell type. The HTX stain information used for computing the tissue region mask 633. A tissue region mask is created by identifying the tissue regions and excluding the background regions. The tissue mask is used to remove the non-tissue background noise in the image, for example the non-tissue regions.

The color- and intensity information provided by the FP3-specific stain is contained in the FP3 channel image 632 which is the marker image corresponding to the biomarker FP3. By applying a low pass intensity filter on the FP3 channel image, a low pass filtered image is obtained. By identifying local intensity maxima in the low pass filtered image 634 and representing different intensity value ranges by respective colors, a heat map 635 of the marker FP3 is computed.

According to embodiments, the FOVs (see FIG. 5) are selected from the top K highest density regions (also called hot spots) of the heat map within the identified intra- and peri-tumor regions. Other methods for finding the candidate FOVs within the regions may be utilized. For example, K can be chosen from 5, 10, 15, 20 etc. A local maximum filter is applied to the low pass filtered image. The local maximums are sorted based on the intensities of the heat map to produce the rank of the hotspots and top K hotspots are used as the K FOVs whose cell count is determined.

To integrate the FOVs so that for each patient case the same set of FOVs are used across different markers, there are several possible options. According to some embodiments the markers may be integrated into a single coordinate system via, for example, a Merge FOVs module 517 shown in FIG. 5, which is one possible method, and involves having different FOVs for different marker images, and analyzing those FOVs independently. The final FOVs are the union of all the FOVs from each marker image (see FIG. 10).

According to other embodiments, the integration or merging FOVs into a single coordinate system involves specifying the most important markers for a given problem, and merging the FOVs based on the selected markers. For example, the PF3 and CD8 may be selected by a user via a GUI or automatically by the image analysis system as the most important markers in a study of melanoma. For example, the two markers could be selected by a user from a plurality of markers for which a respective marker image is available. The method of merging FOVs, in accordance with the present invention, is described below.

For the unmixed images from a multiplex slide, no registration is required. The morphological operations such as union and intersection, may directly be applied to the candidate FOVs, to obtain the merged FOVs.

For scanned images from a serial section of slides, the registration step 966 is applied after obtaining region labels. All the images of single markers are aligned to a reference image and then may be transferred into a same coordinate system. The reference coordinate system can be a slide section in the middle of the tissue block or can be a slide with a specific marker. The reference image can be, for example, one of the marker images or the tumor image.

Figure 10:
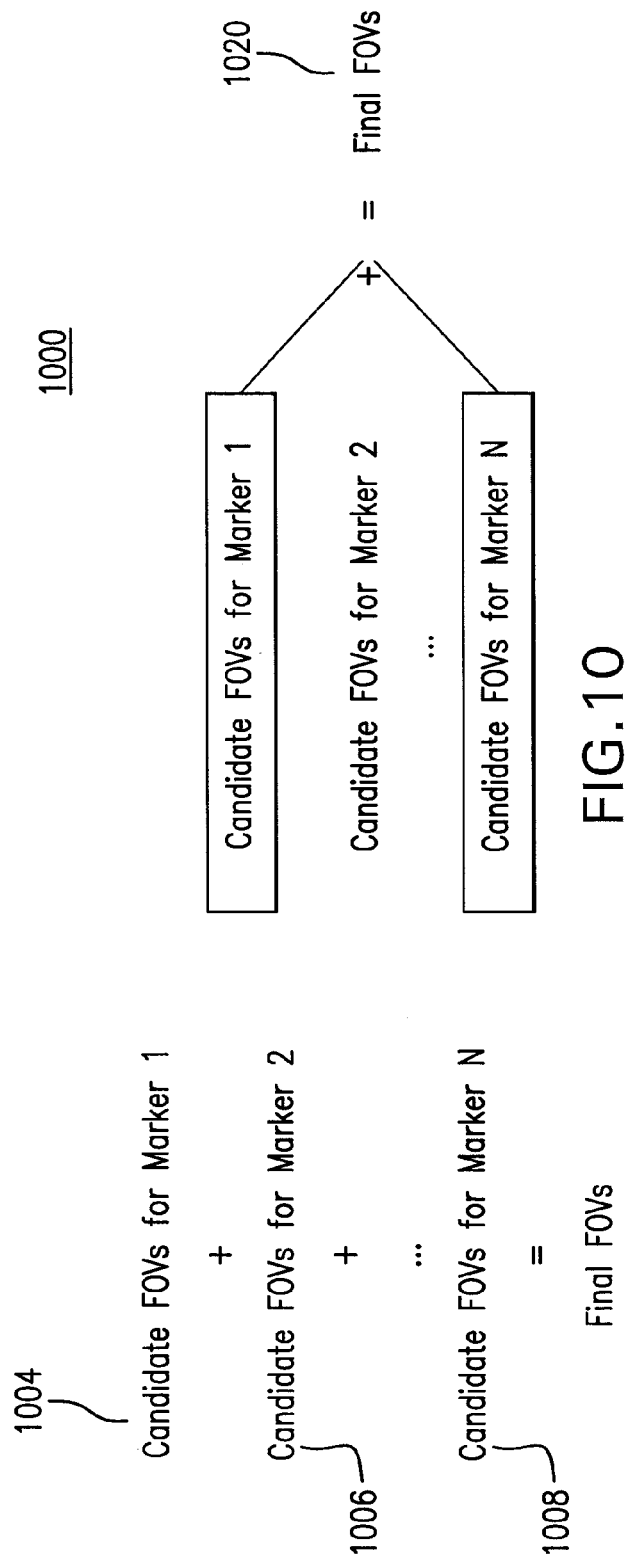
FIG. 10 illustrates FOV merging methods in accordance with embodiments of the present invention.

FIG. 14 shows an example of using the 5plex slide 1414 as the reference coordinate system and aligning other slides and corresponding marker images to it. The FOVs of selected markers (e.g. FP3 and CD8) are then mapped from the aligned individual marker image to a common space or coordinate system, and then merged using morphological operations, such as union and intersection to obtain the merged FOVs (FIG. 10). For scanned images from a serial section of slides, an inverse registration (i.e., a registration that involves aligning the transferred image back to its original coordinate system) is needed to transfer the merged FOVs to the coordinate system of the individual marker images. Mapping the merged FOVS back to the individual marker images and using the merged FOVs instead of the original FOVS identified in the marker images (also referred to as candidate FOVs) for cell count detection may be advantageous as a more robust and/or accurate method of cell count detection may be provided.

As an alternative approach, the FOV selection step is implemented as taking a whole intra- or peri-tumor region as a respective single FOV and compute the cell counts within the entire region.

Finally, cells are identified and counted in each FOV to obtain the immune cell counts and optionally the total cell count in each FOV. The cell detection algorithm can be the radial symmetry based seed detection, ring detection, or learning based detection. The method disclosed in international Patent Application PCT/EP2015/061226 filed May 21, 2015, and entitled "SYSTEMS AND METHODS FOR DETECTION OF STRUCTURES AND/OR PATTERNS IN IMAGES" (which claims priority of Patent Application 62/002,633, filed May 23, 2014, and entitled "Deep Learning for Cell Detection"), which is hereby incorporated by reference in its entirety, is utilized for detecting the cells, in an exemplary embodiment.

The method disclosed in international Patent Application PCT/EP2015/053643 filed and entitled "METHODS, KITS, AND SYSTEMS FOR SCORING THE IMMUNE RESPONSE TO CANCER" (which claims priority of Patent Application 61/943,939 filed Feb. 24, 2014, and entitled "Methods, Kits, and Systems for Scoring the Immune Response to Cancer"), which is hereby incorporated by reference in its entirety, can also be utilized for detecting the cells, in an exemplary embodiment.

An image analysis system 100 is disclosed that contains the following functionalities of generating region labels, selecting FOVs and producing cell counts. In an exemplary embodiment of the present invention, a user interface, associated with a computing device may be utilized to perform the above functionalities. In exemplary embodiments of the present invention, the user interface allows users to load one or more images, visualize region maps (FIG. 11) and/or heat maps, select a number of FOVs, and/or save the FOVs, and generate reports. References to patent applications herein does not constitute an admission of prior art.

The systems and methods of the present invention provide automatic FOV selection, and have been found important to analyzing biological specimens, and useful in computing tissue analyses scores, for example in immune score or immune-related computations. The systems and methods of the present invention overcome disadvantages known in the prior art, such as being un-reproducible and biased in human reader region finding and manual FOV selection, as the automatic method and system of the present invention is able to provide an immune score or immune-related computation via computer without relying on human reader's manual selection.

Without wishing to limit the present invention to any theory or mechanism, the systems and methods of the present invention may offer advantages such as being reproducible, unbiased to human readers, and more efficient.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provides one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks.

(DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet.

Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

We claim:

1. A method for automatic immune score computation, the method being performed by a processor of an image analysis system and comprising:
reading multiple marker images from memory, the pixel intensities of each marker image corresponding to the amount of a respective immune cell marker on a slide used for generating said marker image, each of the multiple marker images corresponding to a different immune cell marker;
computing a tumor image by processing an input image, the input image depicting the same tissue section as the tissue section depicted by the multiple marker images or depicting a tissue section adjacent to one of the tissue sections depicted by the multiple marker images, the tumor image selectively indicating tumor cells contained in one or more tumors;
identifying one or more regions in the tumor image, each identified region belonging to one of a plurality of predefined, cancer-type specific regions within or at the periphery of the one of the one or more tumors;
registering two or more of the marker images and the tumor image to a common coordinate system if the two or more of the marker images and the tumor image originate in different coordinate systems;
for each of the two or more marker images, identifying fields of view (FOVs) in said marker image by:
a) using each of the mapped regions within the marker image as a field of view of the marker image; or
b) processing the marker image for identifying pixel areas whose pixel intensity values are local intensity maxima within the marker image and which lie within one of the identified regions of the tumor image in the common coordinate system; and using the identified pixel areas as the fields of view (FOVs) of said marker image;
the method further comprising:
calculating an immune score, thereby selectively using image information derived from all fields of view (FOVs) of the two or more registered marker images as input.

2. The method of claim 1, the calculation of the immune score comprising:
for each of the fields of view in each of the two or more registered marker images:
applying a cell detection algorithm on pixel intensity information of the marker image and automatically counting all detected cells within said field of view;
determining the immune cell type of the detected cells;
determining the immune cell density within said field of view; and/or
determining the region type of the region of the tumor image to which said field of view belongs to in the common coordinate system and assigning the cell count, cell type and/or cell density information with the determined region type;
processing the cell count, cell type, density and/or the assigned region type information of all fields of views of the two or more marker images, wherein the height of the immune score correlates with the density of immune cells in the identified regions.

3. The method of claim 1, the immune cell marker being selectively indicative of an immune cell type, the immune cell type being one of a T cell, a B cell or a macrophage, the calculation of the immune score comprising:
Determining the cell count, and/or cell density in the fields of views for each of the identified cell types separately, the cell counting being preferentially performed by:
counting the cells in the fields of views identified in the individual marker images; or
by overlaying and merging the fields of vies of multiple marker images for generating merged fields of views; mapping the merged fields of view back to the respective marker images; and counting the cells in the merged fields of views mapped to the individual marker images;
and applying cell-type and cancer-type specific rules on the cell count and/or the cell density and on the type of region within which the field of view is located for calculating the immune score.

4. The method of claim 1, the identification of the fields of view according to b) comprising:
applying a low pass filter on the marker image to obtain a low pass filtered image;
applying a local maximum filter to the low pass filtered image to obtain a heat map of the marker image, the local maxima of the heat map indicating local pixel intensity maxima, the intensity values of the pixels of the heat map indicating the density of the marker at the slide area represented by said pixels; and
identifying a number (K) of pixel areas in the heat map having the highest pixel intensity values within said heat map or whose pixel intensity values are above a threshold; and
using the identified pixel areas as fields of view (FOVs) of said marker image.

5. The method of claim 1, the identification of the regions in the tumor image comprising:
identifying pixel blobs in the tumor image whose intensity values are above a threshold;
identifying one or more features of each of the pixel blobs, the features comprising at least one of the diameter of the pixel blob, the shape of the pixel blob and the distance of the pixel blob to the closest neighboring pixel blob in the tumor image;
applying cancer-type specific rules on the determined one or more features of the pixel blobs for:
determining to which one of a plurality of predefined, cancer-type specific intra-tumor region types the pixel blob belongs and using the identified pixel blobs as the identified regions within one of the one or more tumors;
identifying further pixel regions in the neighborhood of the pixel blobs in the tumor image by respectively expanding the identified intra-tumor regions by a predefined distance, the predefined distance depending on the type of the identified intra-tumor region;

using the identified further pixel regions as the identified regions in the tumor image lying in the periphery of the one or more tumors.

6. The method of claim 1, the plurality of predefined, cancer-type specific regions comprising one or more of:
micro-metastasis: a region in the tumor image with a diameter greater than a first threshold and less than a second threshold;
periphery of Micro-metastasis: a region in the tumor image in the neighborhood of a Micro-metastasis, the neighborhood being defined by a third threshold acting as distance threshold;
macro-metastasis: a region in the tumor image with a diameter greater than the second threshold;
Periphery of Macro-metastasis: a region in the tumor image in the neighborhood of a Macro-metastasis, the neighborhood being defined by a fourth threshold acting as distance threshold;
isolated tumor cell cluster: a region in the tumor image with diameter less than the first threshold;
group of isolated tumor cell clusters: a region in the tumor image comprising a group of isolated tumor cell clusters that are within a fifth threshold to each other;
periphery of group of isolated tumor cell clusters: a region in the tumor image in the neighborhood of a group of isolated tumor cell clusters, the neighborhood being defined by a sixth threshold acting as distance threshold.

7. The method of claim 6, the cancer type being melanoma, wherein:
the first threshold is 0.2 mm;
the second threshold is 0.7 mm;
the third threshold is 0.2 mm;
the fourth threshold is 0.2 mm;
the fifth threshold is 0.5 mm; and/or
the sixth threshold is 0.2 mm.

8. The method of claim 1, further comprising:
assigning labels to each of the regions in the tumor image, each label being indicative of the type of said region;
transferring the labels of the regions from the common coordinate system to the coordinate system of each of the marker images.

9. The method of claim 1, the identification of the fields of view comprising:
computing a tissue mask from an image from which at least one of the marker images and/or the tumor image is derived;
apply the tissue mask on said marker image or a derivative thereof for generating a noise-reduced marker image.

10. The method of claim 9, further comprising:
computing a heat map from the noise-reduced marker image;
identifying local maxima in the heat map; and
Applying an intensity threshold algorithm on the local maxima for identifying the fields of view as the ones of the local intensity maxima having the highest intensity values.

11. The method of claim 9, the method further comprising generating the tissue mask by:
generating, by the image analysis system, a luminance image from the image from which at least one of the marker images and/or the tumor image is derived, each pixel in the luminance image having assigned a luminance value derived from its R, G- and B intensity values;
generating, by the image analysis system, a luminance variance image, each pixel in the luminance variance image having assigned a data value being indicative of the variance of luminance in the neighborhood of said pixel;
applying, by the image analysis system, a threshold filter on the luminance variance image for generating a threshold-filtered, binary image that masks all pixels whose assigned data value indicative of the variance of luminance in the neighborhood are below a luminance variability threshold; and using the threshold-filtered, binary image as the tissue mask for masking pixel regions of low luminance variability as non-tissue regions.

12. The method of claim 11, further comprising:
generating, by the image analysis system, a luminance median image from the image from which at least one of the marker images and/or the tumor image is derived, each pixel in the luminance median image having assigned a data value being indicative of the median of the luminance values of pixels in the neighborhood of said pixel;
applying, by the image analysis system, a threshold filter on the luminance median image for generating a further threshold-filtered, binary image that masks all pixels whose assigned data value indicative of the median of luminance in the neighborhood is above a median-luminance threshold;
combining the threshold-filtered, binary image and the further threshold-filtered binary image for providing the tissue mask, the tissue mask masking pixel regions of low luminance variability as non-tissue regions and masking pixel regions with a median luminance above a median-luminance threshold.

13. The method of claim 1, further comprising:
generating the marker images by applying a color unmixing procedure on a single multiplex slide comprising a tumor tissue section, each color channel corresponding to one of the immune cell markers; or
generating the marker images by taking an image from each of a plurality of single stain slides respectively comprising one of multiple adjacent tumor tissue sections and respectively being stained by a different one of the immune cell markers.

14. The method of claim 1, further comprising:
receiving, by a user interface operatively coupled to the image analysis system, a user's selection of the two or more marker images, wherein the registering of the field of views is selectively performed for marker images selected by the user; and/or
receiving, by a user interface operatively coupled to the image analysis system, a user's selection of two or more of the tumor region types, wherein the identification of the FOVS is selectively performed within tumor regions of the selected two or more tumor region types.

15. An imaging method for generating fields of view (FOVs), the method comprising:
receiving an image of a biological specimen stained with one or more stains;
identifying at least one tumor region in the image;
measuring a diameter of the tumor region;
identifying an extended region size based on data stored in memory that correlates the diameter of the tumor region to the extended region size;
generating on a display the extended region, wherein the extended region encompasses the tumor region;
identifying, automatically, FOVs in the extended region and the tumor region;

counting immune cells in the identified FOVs; and generating a prognostic score based on the cells counted in the FOVs, wherein the prognostic score indicates a clinical outcome of a patient.

16. The method of claim 15, further comprising:

outputting the prognostic score to a display.

17. An imaging system for automatic immune score computations, comprising:

reading individual marker images from at least one of an unmixed multiplex slide and set of single stain slides;

computing a tissue region mask from one of the individual marker images, wherein the tissue mask distinguishes tissue-containing regions from non-tissue containing regions;

identifying tumor-containing regions in the tissue containing regions;

measuring the tumor containing regions and generating a measured size for each tissue containing region;

associating at least one of the measured size and a label with each tumor-containing region based on the measured size of the tumor-containing region and generating tumor region characteristic data;

storing tumor region data in memory;

generating an extended region around each tumor-containing region based on the tumor region characteristic data and generated extended tumor region data;

storing extended tumor region data in memory;

mapping the tissue-containing regions to the other of the individual marker images, and generating mapped tissue regions in the other of the individual marker images;

associating tumor region characteristic data and the extended region tumor data with the mapped tissue regions in the other of the individual marker images;

automatically identifying FOVs in each of tumor containing regions and extended tumor regions of the individual marker images;

selecting individual marker images;

merging the identified FOVs from the selected individual marker images;

detecting, automatically, the cells in the FOVs;

counting, automatically, the cells in the FOVs; and generating a prognostic score based on the cells counted.

18. The system of claim 17, wherein when the tumor-containing regions are labels are the Isolated Melanoma, Micro-metastasis, Macro-metastasis, and Group of Isolated Melanoma.

19. The system of claim 17, wherein when the tumor-containing region measurement is greater than 0.7 mm, then the tumor containing region is labeled macro-metastasis.

20. The system of claim 19, wherein when the tumor-containing region measurement is at least one of greater than or equal to 0.2 mm and less than or equal to 0.7 mm the tumor-containing region and labeled micro-metastasis, an extended boundary region of approximately 0.2 mm is generated around the tumor containing region.

* * * * *